(12) United States Patent
Nakajima

(10) Patent No.: US 10,027,060 B2
(45) Date of Patent: Jul. 17, 2018

(54) ADAPTER DEVICE AND ELECTRONIC DEVICE

(71) Applicant: SONY CORPORATION, Tokyo (JP)

(72) Inventor: Takeshi Nakajima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 617 days.

(21) Appl. No.: 14/429,587

(22) PCT Filed: Sep. 17, 2013

(86) PCT No.: PCT/JP2013/075014
§ 371 (c)(1),
(2) Date: Mar. 19, 2015

(87) PCT Pub. No.: WO2014/065042
PCT Pub. Date: May 1, 2014

(65) Prior Publication Data
US 2015/0236447 A1     Aug. 20, 2015

(30) Foreign Application Priority Data
Oct. 26, 2012   (JP) ................................ 2012-236927

(51) Int. Cl.
*H01R 13/629*      (2006.01)
*G03B 17/56*       (2006.01)

(52) U.S. Cl.
CPC ....... *H01R 13/62933* (2013.01); *G03B 17/56* (2013.01); *Y10T 403/595* (2015.01)

(58) Field of Classification Search
CPC .......................... H01R 13/62933; G03B 17/56
(Continued)

(56) References Cited

U.S. PATENT DOCUMENTS 6,069,790 A * 5/2000 Howell ................. G06F 1/1632
                                                                292/122
6,229,893 B1 * 5/2001 Chen ................... B60R 11/0241
                                                                379/446
(Continued)

FOREIGN PATENT DOCUMENTS

EP          1 093 972 A2     4/2001
JP          6-70209 A        3/1994
(Continued)

OTHER PUBLICATIONS

Extended European Search Report dated Apr. 11, 2016 in European Patent Application No. 13849741.7.
(Continued)

*Primary Examiner* — Alexander Gilman
(74) *Attorney, Agent, or Firm* — Oblon, McClelland, Maier & Neustadt, L.L.P.

(57) ABSTRACT

In an attachment stage 20 of an adapter device 10, a fastening unit 221 fastened to a main body device is provided on an attachment surface 21 in advance. A connector 55 is provided on a housing 50. Further, the adapter device 10 is provided with a movement direction conversion unit configured to convert a movement in an operation direction of an operation lever 41 into an insertion and detachment direction of the connector, and move forward and backward the housing 50 in the insertion and detachment direction of the connector 55 with respect to the attachment stage 20 in accordance with the operation force. In the movement direction conversion unit, a first link mechanism converts the movement in the operation direction of the operation lever 41 into a movement in a surface direction of the attachment surface 21 of a hook unit 321*f*, and a second link mechanism converts the movement in the surface direction of the hook unit 321*f* into the movement in the insertion and detachment direction of the connector of the housing 50 with
(Continued)

respect to the attachment stage 20. The hook unit 221*f* of the 221 is fastened to the main body device and the operation lever 41 is operated, so that the insertion and detachment operation of the connector can be performed in a stable manner.

13 Claims, 26 Drawing Sheets

(58) Field of Classification Search
USPC .......................................................... 439/100
See application file for complete search history.

(56) References Cited

U.S. PATENT DOCUMENTS

| | | | | |
|---|---|---|---|---|
| 6,280,212 B1* | 8/2001 | Nguyen | ................ | G06F 1/1632 439/157 |
| 6,775,561 B1* | 8/2004 | Peiker | ................ | B60R 11/0241 455/569.1 |
| 8,179,672 B2* | 5/2012 | Carnevali | ............. | G06F 1/1632 361/679.41 |
| 9,003,626 B2* | 4/2015 | Carnevali | ............. | G06F 1/1632 248/316.4 |
| 9,245,818 B2* | 1/2016 | Boyd | ...................... | H05K 3/301 |
| 2004/0087193 A1* | 5/2004 | Mikhail | ........... | H01R 13/62933 439/157 |
| 2006/0205253 A1* | 9/2006 | Stowers | ........... | H01R 13/62966 439/157 |
| 2013/0107446 A1* | 5/2013 | Carnevali | ............. | G06F 1/1632 361/679.43 |
| 2015/0219982 A1* | 8/2015 | Aiello | ................... | G03B 17/563 361/601 |
| 2015/0236447 A1* | 8/2015 | Nakajima | ........ | H01R 13/62933 403/322.4 |

FOREIGN PATENT DOCUMENTS

| | | |
|---|---|---|
| JP | 2000-232506 A | 8/2000 |
| JP | 2011-228769 A | 11/2011 |

OTHER PUBLICATIONS

Combined Chinese Office Action and Search Report dated Oct. 10, 2016 in Patent Application No. 201380054914.X with English translation.

* cited by examiner

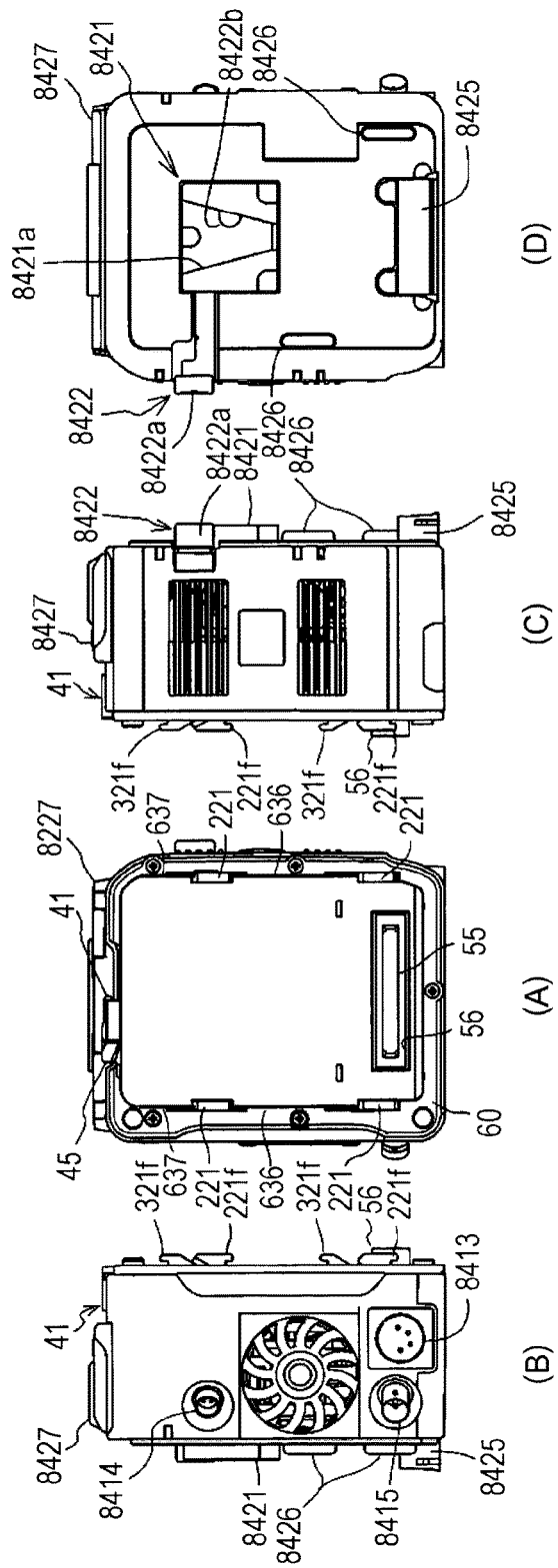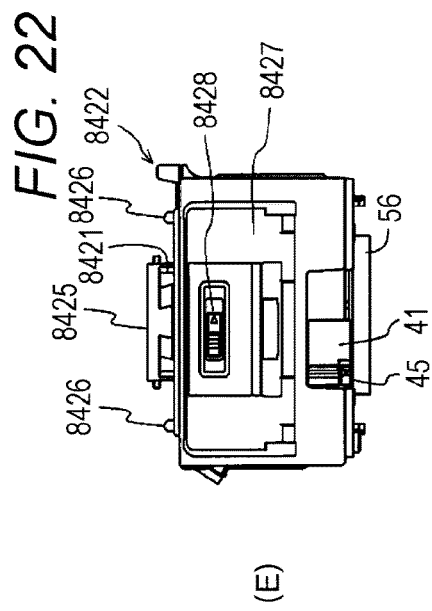
FIG. 22

ADAPTER DEVICE AND ELECTRONIC DEVICE

TECHNICAL FIELD

This technique relates to an adapter device and an electronic device, and enables a connector to perform insertion and detachment operation in a stable manner.

BACKGROUND ART

Conventionally, an electronic device is provided with a detachable adapter device to, e.g., expand and change a function. For example, as indicated in Patent Document 1, in a video camera device having a dockable structure, a camera main body unit and an adapter unit (a camera adapter, a videotape recorder, various other kinds of peripheral devices) are detachable in terms of electrical and mechanical manner at the front and the back in the optical axis direction.

CITATION LIST

Patent Document

Patent Document 1: Japanese Patent Application Laid-Open No. 2011-228769

SUMMARY OF THE INVENTION

Problems to be Solved by the Invention

When an adapter device is attached to and detached from a main body device, and force is applied to the connector in a direction different from the insertion and detachment direction, the connector may be damaged or contact failure and the like may occur. For example, the adapter-side connector is engaged with the main body-side connector when an adapter-side connector is provided on an adapter-side attachment surface of the adapter device, a main body-side connector is provided on a main body-side attachment surface of the main body device, and the adapter device is attached to the main body device.

Accordingly, one side of the adapter-side attachment surface is fastened to the main body device, and with a pivot operation using the fastened one side as the pivot axis, the adapter-side connector can be engaged with the main body-side connector. However, since the adapter-side connector is pivoted around the fastened one side serving as the pivot axis, insertion and detachment are performed with an inclination with respect to the insertion and detachment direction of the main body-side connector.

When a user slides the adapter device as the position of the mounting surface to cause the adapter device to be engaged with the connector, a large force is required during insertion and detachment of the connector, and therefore, it is not easy to insert or detach the adapter device by applying a uniform force to the connector.

For this reason, in the case where insertion and detachment are performed with an inclination with respect to the insertion and detachment direction or in the case where uneven force is applied to the connector, the connector may be damaged or deformed, or contact failure and the like may occur, and this reduces the reliability of the connection portion.

Therefore, it is an object of this technique to provide an adapter device and an electronic device capable of performing insertion and detachment operation of a connector in a stable manner.

Solutions to Problems

A first aspect of this technique lies in an adapter device including: an attachment stage on which a fastening unit fastened to a main body device is provided on an attachment surface in advance; a main body unit provided with a connector; and a movement direction conversion unit configured to receive an operation force, convert a movement in an operation direction into an insertion and detachment direction of the connector, and move forward and backward the main body unit in the insertion and detachment direction of the connector with respect to the attachment stage in accordance with the operation force.

In this technique, in the attachment stage of the adapter device, the fastening unit fastened to the main body device is provided on the attachment surface in advance. Alternatively, the main body unit of the adapter device is provided with a connector. Further, the adapter device is provided with a movement direction conversion unit using, for example, a first link mechanism configured to convert a movement in an operation direction into a movement in a surface direction and a second link mechanism configured to convert a movement in the surface direction into a movement in an insertion and detachment direction of the connector, and converts the movement in the operation direction into the insertion and detachment direction of the connector, and moves forward and backward the main body unit in the insertion and detachment direction of the connector with respect to the attachment stage in accordance with the operation force. The first link mechanism includes, for example, an operation lever configured to receive an operation force and rotate, a driving shaft configured to move in accordance with a rotation operation of the operation lever, and a slider configured to be moved in a surface direction in accordance with the rotation operation of the operation lever by the driving shaft. The second link mechanism includes a slider having an inclined surface inclined with respect to the surface direction and attached to the main body unit in a movable manner in the surface direction, and a direction conversion unit formed on the attachment stage and having an inclined surface inclined with respect to the insertion and detachment direction, wherein the inclined surface of the slider slides on the inclined surface in accordance with a movement in the surface direction of the slider, so that the main body unit is moved in the insertion and detachment direction with respect to the attachment stage. Further, a second fastening unit fastened to the main body device in accordance with a movement in the connector insertion direction of the main body unit is provided on, for example, the slider attached movably in the surface direction according to the operation force with respect to the main body unit. A first fastening unit, which is the fastening unit provided in advance on the attachment surface, and the second fastening unit, which is provided on the slider, are formed in a hook shape, and the first fastening unit and the second fastening unit are fastened to the main body device in directions opposite to each other.

In the adapter device, a restriction unit restricting a movement in a direction different from the fastening direction of the fastening unit by engaging with the main body device is provided on the attachment surface. Further, the main body unit is provided with a connector insertion guide protruding in the insertion direction with respect to the connector on the basis of a position of the connector, and the connector insertion guide is protruding from the attachment surface of the attachment stage in accordance with the main body unit moving in the insertion direction of the connector.

A holding mechanism configured to hold the operation lever receiving an operation force at a connector insertion completion position, and a cancel mechanism configured to receive an operation force and cancel a holding state at the connector insertion completion position are provided. This operation lever is urged in a connector detachment and disconnection operation direction, and when the operation lever is in the connector insertion completion position, the holding mechanism fastens the fastening unit provided on the operation lever, holds the operation lever at the connector insertion completion position, and the cancel mechanism receives an operation force and cancels the fastening state of the fastening unit provided on the operation lever.

A second aspect of this technique lies in an electronic device including a main body device and an adapter device attached to the main body device and electrically connected to the main body device via a connector, wherein the adapter device includes: an attachment stage on which a fastening unit fastened to the main body device is provided on an attachment surface in advance; a main body unit provided with the connector used for electrical connection with the main body device; and a movement direction conversion unit configured to receive an operation force with an operation lever, convert a movement in an operation direction into an insertion and detachment direction of the connector, and move forward and backward the main body unit in the insertion and detachment direction of the connector with respect to the attachment stage in accordance with the operation force, wherein the movement direction conversion unit receives an operation force for moving, in a non-protruding direction, the operation lever protruding with respect to the main body device during attachment to the main body device and converts a movement in the operation direction into an insertion direction of the connector, and the movement direction conversion unit receives an operation force for moving, in a protruding direction, the operation lever in a non-protruding state and converts the movement in the operation direction into the detachment and disconnection direction of the connector.

Effects of the Invention

According to this technique, the attachment stage of the adapter device is fastened to the main body device by the fastening unit provided on the attachment surface of the attachment stage. The main body unit of the adapter device is provided with the connector, and the movement direction conversion unit receives an operation force and converts the movement in the operation direction into the insertion and detachment direction of the connector to move forward and backward the main body unit in the insertion and detachment direction of the connector with respect to the attachment stage in accordance with the operation force. Therefore, since the attachment stage is fastened to the main body device, the connector provided on the main body unit moves in the insertion and detachment direction in accordance with the operation force, and the insertion and detachment operation of the connector can be performed in a stable manner. The effects described in this specification are examples, are the effects are not limited thereto. In addition, there may be additional effects.

BRIEF DESCRIPTION OF DRAWINGS

FIGS. 22(A) to 22(E) are figures showing an example of an external view of the recording and playback device.

MODE FOR CARRYING OUT THE INVENTION

Hereinafter, a mode for carrying out the present technique will be explained. It should be noted that the explanation will be given in the following order.
1. Configuration of adapter device
2. Attachment and detachment operation of adapter device
3. Electronic device using adapter device <1. Configuration of Adapter Device>

An adapter device includes an attachment stage, a main body unit, and a movement direction conversion unit. On the attachment stage, a fastening unit fastened to the main body device is provided in advance on the attachment surface. The main body unit is provided with a connector. The movement direction conversion unit receives an operation force, and converts the movement in the operation direction into the insertion and detachment direction of the connector, and moves forward and backward the main body unit in the insertion and detachment direction of the connector with respect to the attachment stage in accordance with the operation force.

Hereinafter, in an embodiment of the present technique, a configuration for moving forward and backward the main body unit in accordance with an operation force in the insertion and detachment direction of the connector with respect to the attachment stage fastened to the main body device in accordance with the rotation operation of an operation lever will be explained as an example.

Figure 1:
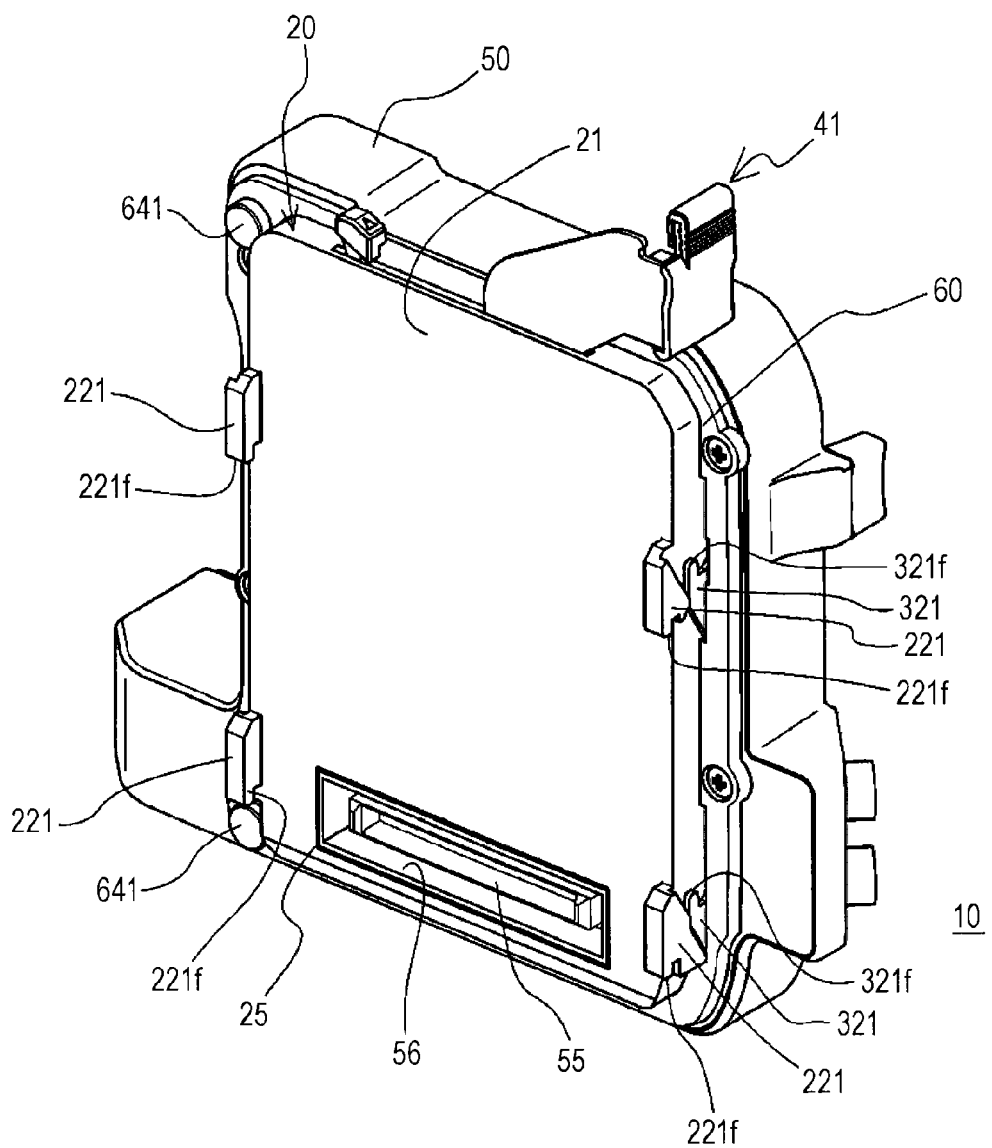
FIG. 1 is a perspective view showing an example of an external view of an adapter device.
Figure 2:
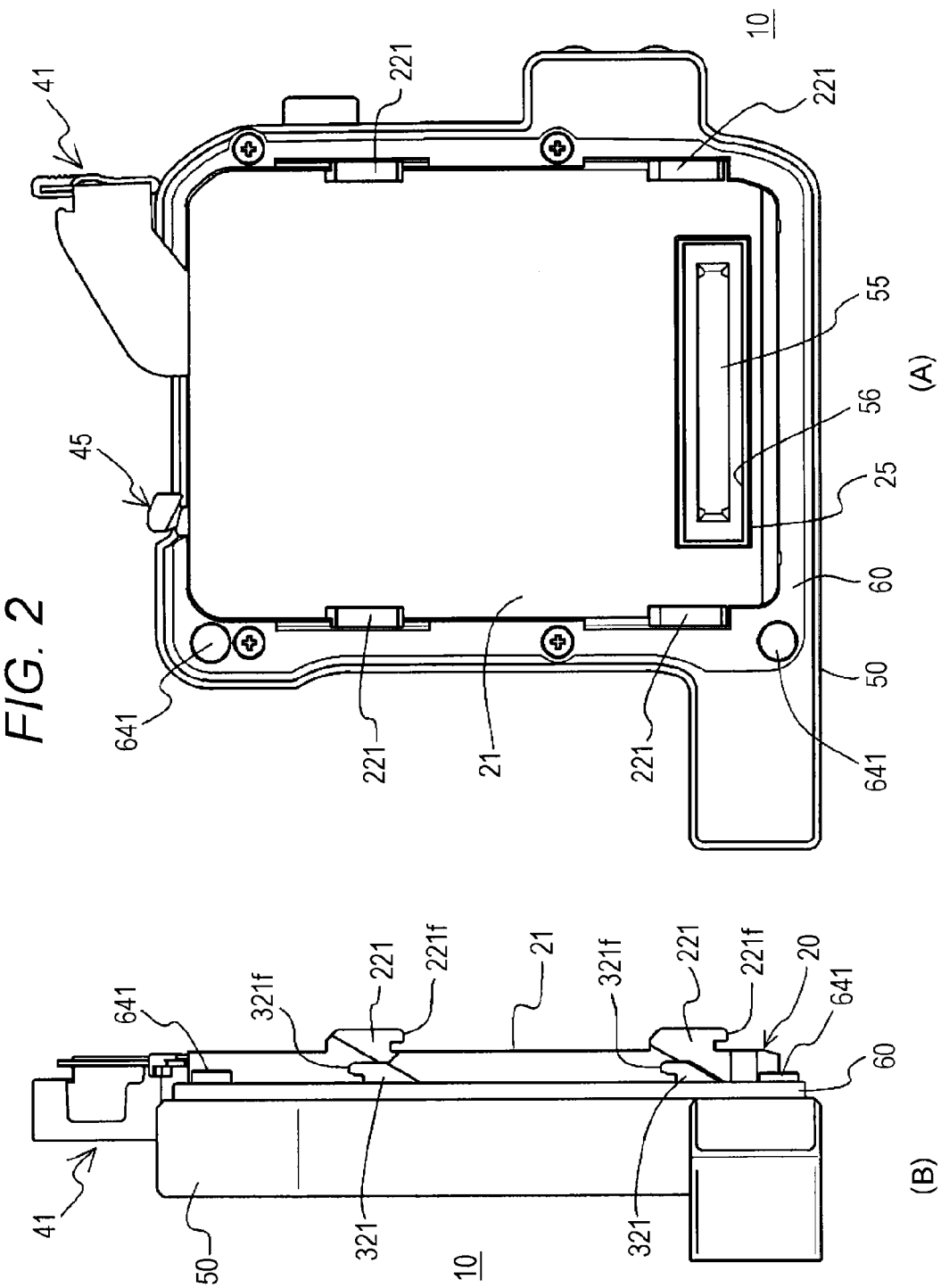
FIGS. 2(A) and 2(B) show a front view and a side view of the adapter device.

FIG. 1 is a perspective view showing an example of an external view of the adapter device. FIGS. 2(A) and 2(B) show a front view and a side view of the adapter device. FIG. 2(A) is a front view, and FIG. 2(B) is a side view. In the explanation below, a surface side attached to the main body device will be denoted as a front surface (forward).

An adapter device 10 includes an attachment stage 20, a housing 50 corresponding to the main body unit, and a cover unit 60 covering an opening portion at the side of the main body device when the attachment stage 20 is attached to the housing 50.

The attachment stage 20 includes fastening units 221 on an attachment surface 21 facing the attachment surface of the main body device to be engaged with the main body device. For example, the fastening unit 221 includes a hook unit 221f engaged with an engagement depression portion provided in the main body device, and the hook unit 221f is provided to project forward from the attachment surface 21 and with a predetermined interval in the vertical direction at both side end portions of the attachment stage 20.

The attachment stage 20 is provided with an insertion hole 25 through which a connector insertion guide 56 provided on the housing 50 is inserted.

The housing 50 is provided with a connector 55 and the connector insertion guide 56 provided in a frame shape to project in the connector insertion direction with respect to the connector 55 on the basis of the position of the connector 55. The cover unit 60 is fixed to the housing 50 with screws and the like. Further, with the housing 50 and the cover unit 60, the attachment stage 20 is held in a movable manner in the insertion and detachment direction of the connector by inserting the connector insertion guide 56 into the insertion hole 25 of the attachment stage 20. Further, the housing 50 accommodates a movement direction conversion unit for converting the movement in the operation direction applied to the operation lever 41 into a movement in the insertion and detachment direction of the connector of the housing 50 with respect to the attachment stage 20. In addition, the housing 50 may be configured to include an electric circuit connected to the terminal of the connector 55 to perform various kinds of operations and include a connection cable, a connection substrate, and the like for connection between the terminal of the connector 55 and an external connection terminal and the like provided on the housing 50.

In FIGS. 1, 2(A), and 2(B), a hook unit 321f, a lock cancel operation lever 45, and a restriction projection portion 641 are shown, but the details thereof will be explained later.

Figure 3:
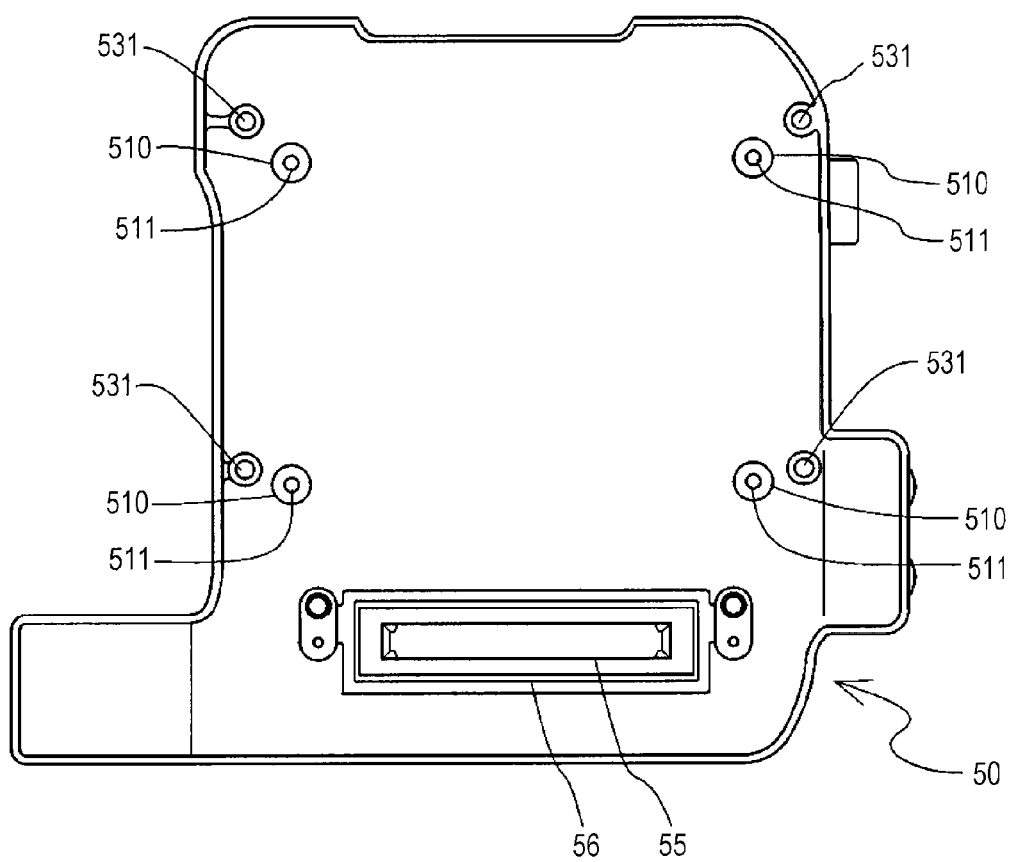
FIG. 3 is a front view of a housing.

FIG. 3 shows a front view of a housing. As explained above, the connector 55 and the connector insertion guide 56 are attached to the housing 50. The housing 50 is provided with support shafts 510 for supporting the slider 30 is formed at positions corresponding to supported holes 311 of the slider 30 (see FIGS. 8(A) to 8(C)) explained later, and at a distal end of the support shaft 510, a sliding pin 511 having a diameter less than that of the support shaft 510 is provided. In the slider 30, the sliding pins 511 are inserted into the supported holes 311, and the slider 30 is held so as to be able to slide only in the longitudinal direction of the supported hole 311 by using the support shafts 510 and slider reception units 636, 637 of the cover unit 60 explained later. At the side ends of the housing 50, screw holes 531 for attaching the cover unit 60 are formed.

Figure 4:
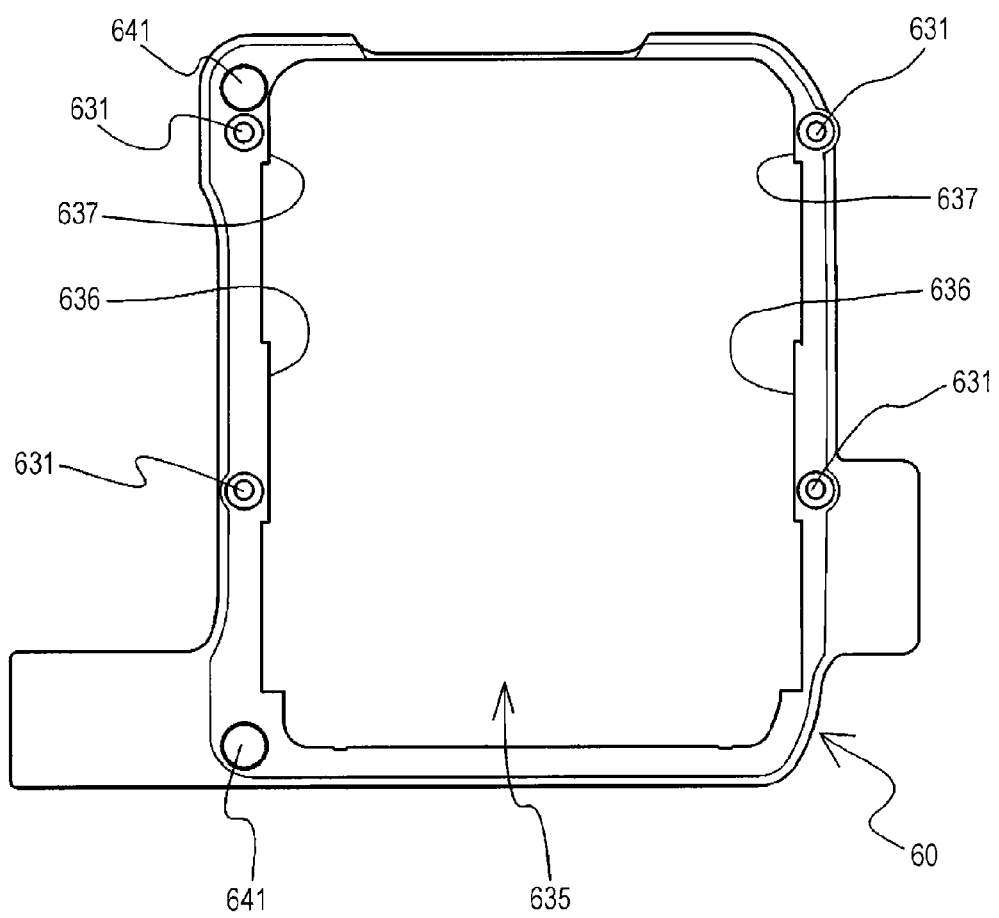
FIG. 4 is a front view of the cover unit.

FIG. 4 shows a front view of the cover unit. The cover unit 60 is formed to cover the opening portion of the housing 50 at the side of the main body device when the attachment stage 20 is attached to the housing 50. The cover unit 60 is formed with insertion holes 631 at the positions of the screw holes 531 of the housing 50. An opening portion 635 into which the attachment stage 20 is fit is formed at the central portion of the cover unit 60. At the side end of the opening portion 635, the slider reception units 636, 637 are formed to protrude therefrom. Further, the surface of the cover unit 60 facing the main body device is formed with a restriction unit for restricting the movement of the adapter device in a direction substantially parallel to the attachment surface (hereinafter simply referred to as "surface direction"). The embodiment shows an example where the restriction projection portions 641 are provided in the adapter device as the restriction units, and restriction depression portions 741 engaged with the restriction projection portions 641 are provided in the main body device.

Figure 5:
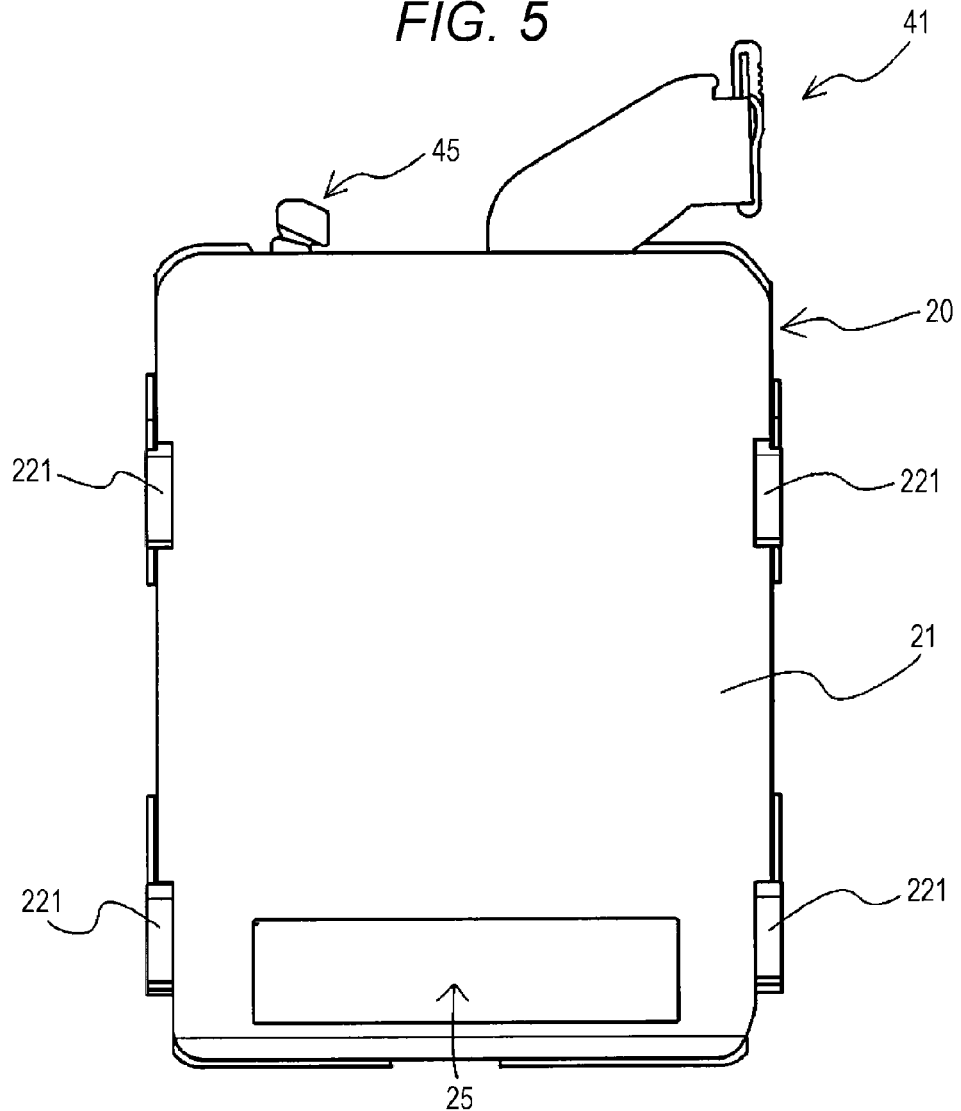
FIG. 5 is a front view of an attachment stage where a movement direction conversion unit is provided.
Figure 6:
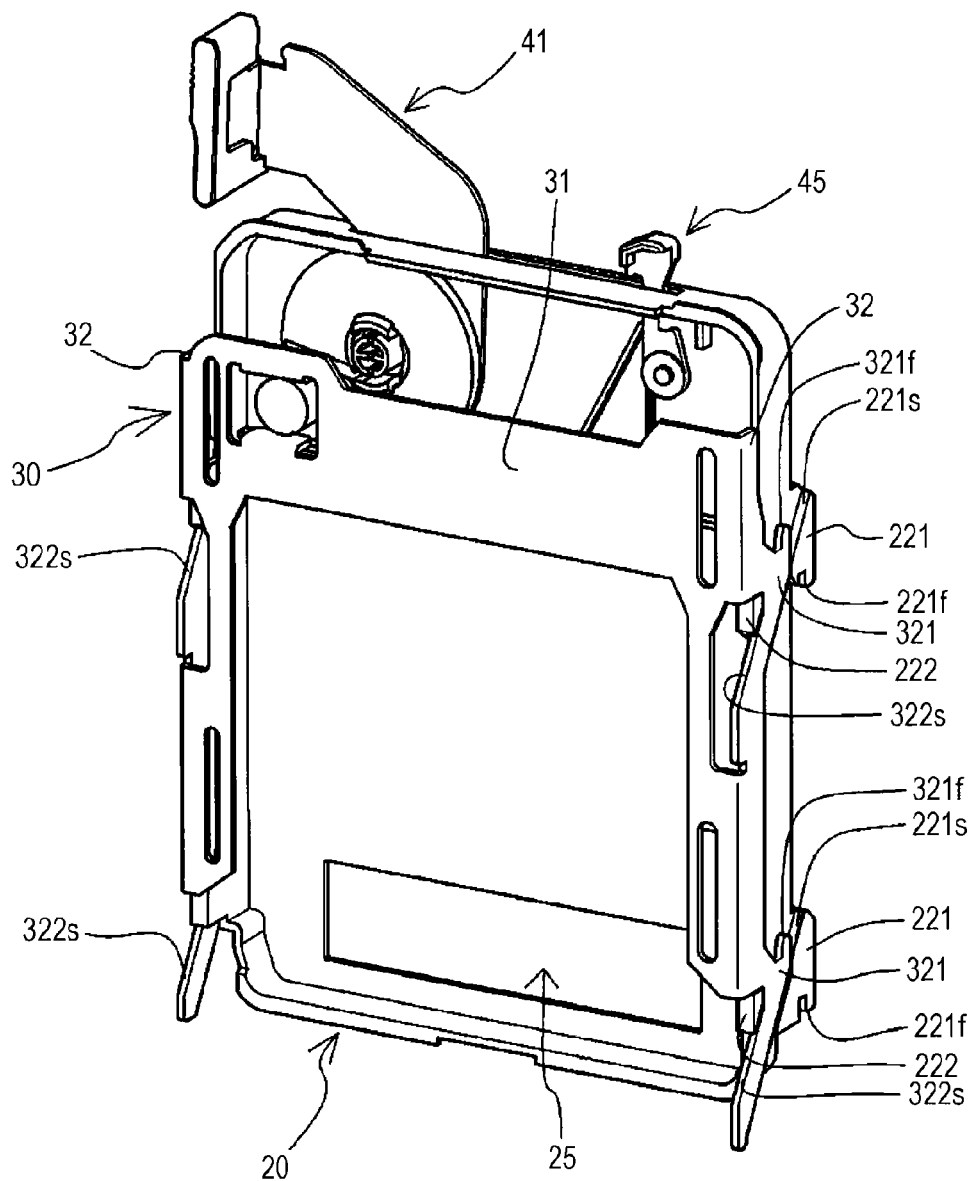
FIG. 6 is a perspective view showing a back surface side of the attachment stage where the movement direction conversion unit is provided.
Figure 7:
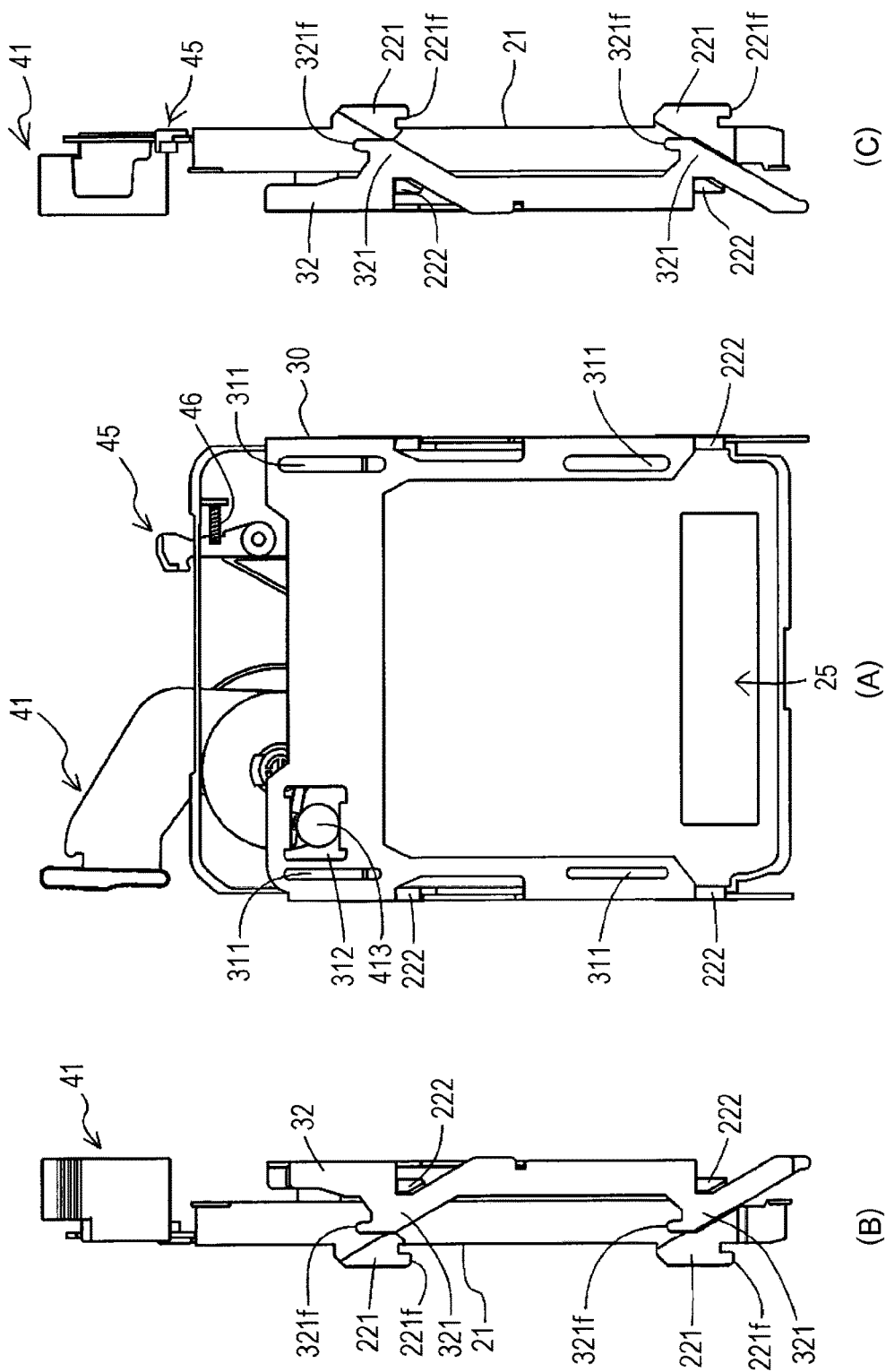
FIGS. 7(A) to 7(C) are a back view and side views of the attachment stage where the movement direction conversion unit is provided.

FIG. 5 shows an example of a front view of an attachment stage where a movement direction conversion unit is provided. FIG. 6 is a perspective view showing a back surface side of the attachment stage where the movement direction conversion unit is provided. FIGS. 7(A) to 7(C) show a back view and side views of the attachment stage where the movement direction conversion unit is provided.

The movement direction conversion unit includes, for example, a first link mechanism configured to receive an operation force and convert a movement in an operation direction into a movement in a surface direction and a second link mechanism configured to convert the movement in the surface direction into a movement in an insertion and detachment direction of a connector. In FIGS. 5 to 7(C), the operation lever 41 receives an operation force, and the movement of the operation lever 41 is converted into the movement in the surface direction of the slider 30. Further, a configuration is shown for example, in which, on the attachment stage 20, the movement in the surface direction of the slider 30 is converted into the movement in the insertion and detachment direction of the connector. More specifically, a configuration will be shown for example, in which the movement in the surface direction is converted into the movement in the insertion and detachment direction of the connector by the sliding operation between the fastening unit 221 and the fastening unit 222 corresponding to the first fastening unit and the inclined surface of a fastening unit 321 corresponding to the second fastening unit provided on the slider 30.

Figure 8:
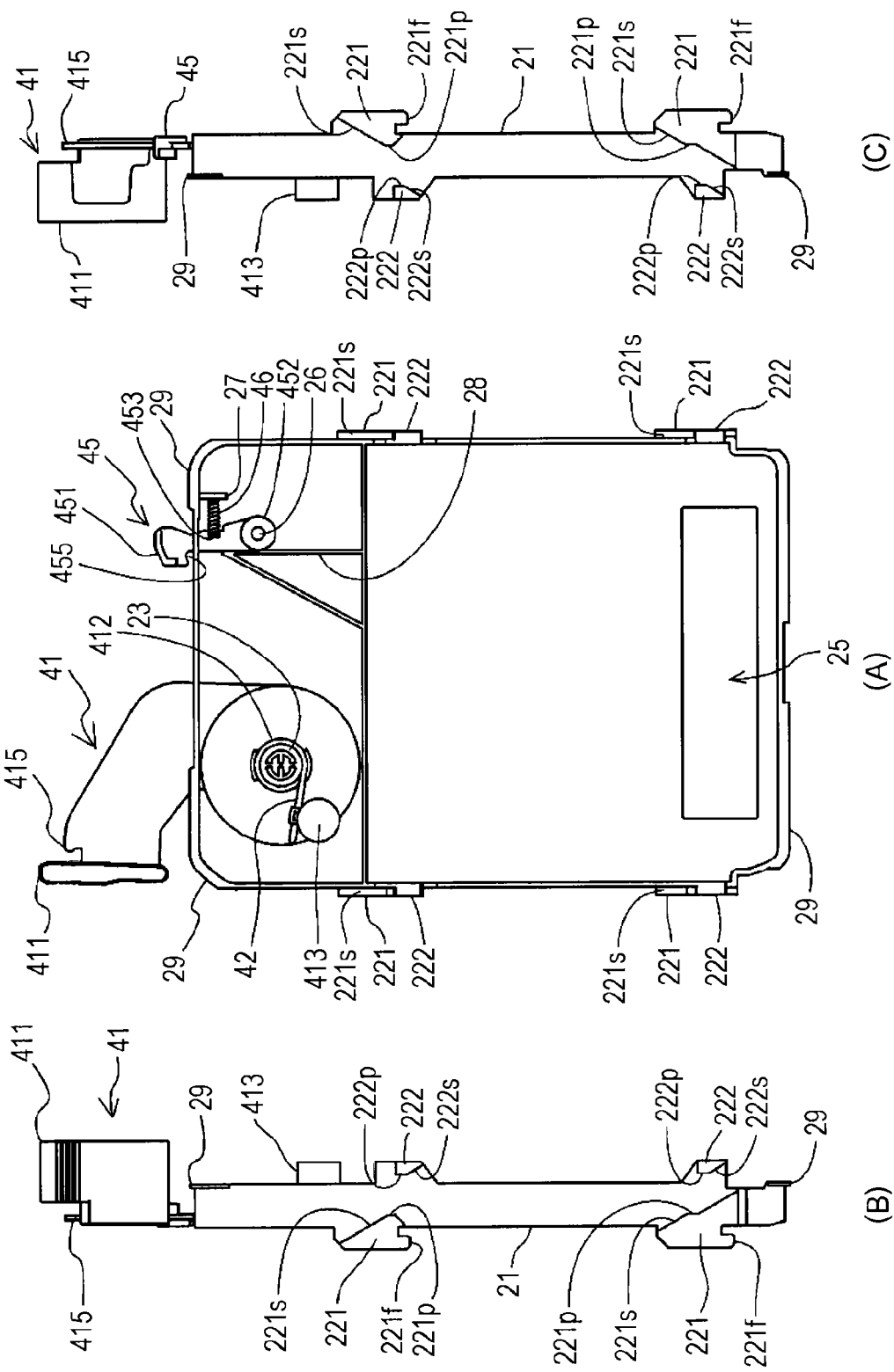
FIGS. 8(A) to 8(C) are a back view and side views of the attachment stage before a slider is attached.

FIGS. 8(A) to 8(C) show a back view and side views of the attachment stage before the slider is attached. A rotation shaft 23 for rotatably holding the operation lever 41 is formed on the back surface side of the attachment stage 20. A rotation shaft 26 for rotatably holding the lock cancel operation lever 45 is formed on the back surface side of the attachment stage 20.

At the back surface side of the attachment stage 20, an urging member for urging the lock cancel operation lever 45, e.g., a coil spring 46, is provided in order to hold the operation lever 41 in a collapsed state. Further, at the back surface side of the attachment stage 20, a rotation restriction unit 28 for restricting rotation of the lock cancel operation lever 45 urged by the coil spring 46 and a spring holding unit 27 for holding the coil spring 46 are provided. A flange portion 29 is formed at the rear end side of the upper side end portion and the lower side end portion of the attachment stage 20, and in a case where the attachment stage 20 is provided between the housing 50 and the cover unit 60, the flange portion 29 of the attachment stage 20 is fastened to the inner surface of the cover unit 60, and the movement of the attachment stage 20 in the forward direction is restricted.

At one end of the operation lever 41, an operation unit 411 is provided, and at the other end thereof, a shaft hole 412 is provided. The rotation shaft 23 of the attachment stage 20 is inserted into the shaft hole 412 of the operation lever 41, and the operation lever 41 is rotatably supported. At the other end of the operation lever 41, a slider driving shaft 413 is provided at the position away from the shaft hole 412 in the diameter direction, and the position of the slider driving shaft 413 is configured to be moved in accordance with the rotation operation of the operation lever 41.

The operation lever 41 is urged by the urging member in the standing direction. For example, a torsion coil spring 42 is used as an urging member, and one end of the torsion coil spring 42 is fixed at the rotation shaft 23, and the other end thereof is fastened to the slider driving shaft 413, and the operation lever 41 is urged by the torsion coil spring 42 in the standing direction. When the operation lever 41 is in the collapsed state, a lever fastening unit 415 formed in a hook shape at one end side of the operation lever 41 is fastened to the lock cancel operation lever 45, and the operation lever 41 is held in the collapsed state.

At one end of the lock cancel operation lever 45, an operation unit 451 is provided, and at the other end thereof, a shaft hole 452 is provided. The rotation shaft 26 of the attachment stage 20 is inserted into the shaft hole 452 of the lock cancel operation lever 45, and the lock cancel operation lever 45 is rotatably supported. A spring holding unit 453 is provided between the operation unit 451 and the shaft hole 452. The coil spring 46 is engaged and provided between this spring holding unit 453 and the spring holding unit 27 formed on the attachment stage 20, so that the operation unit 451 of the lock cancel operation lever 45 is urged to rotate in the direction of the operation lever 41. The lock cancel operation lever 45 comes into contact with the rotation restriction unit 28 formed on the attachment stage 20, and the rotation operation of the lock cancel operation lever 45 is restricted. At the lower portion of the operation unit 451, a fastening piece 455 fastened to the lever fastening unit 415 of the lock cancel operation lever 45 is formed.

With the operation lever 41 and the lock cancel operation lever 45 thus configured, when the operation lever 41 is operated and rotates in a direction opposite to the urging direction to come closer to the collapsed state, the side end of the operation lever 41 comes into contact with the lock cancel operation lever 45. Thereafter, when the operation lever 41 rotates, the lock cancel operation lever 45 is rotated in a direction opposite to the urging direction by the operation lever 41. Further, when the operation lever 41 is rotated and the lever fastening unit 415 is at the position of the fastening piece 455 of the lock cancel operation lever 45, then the lock cancel operation lever 45 rotates in the urging direction, and the lever fastening unit 415 of the operation lever 41 is fastened to the fastening piece 455 of the lock cancel operation lever 45. More specifically, the operation lever 41 is fixed in the collapsed state by the lock cancel operation lever 45. When operation is performed to move the operation unit 451 of the lock cancel operation lever 45 in a direction opposite to the urging direction, then the fastening state between the lever fastening unit 415 of the operation lever 41 and the fastening piece 455 of the lock cancel operation lever 45 is cancelled. Therefore, the lock cancel operation lever 45 operates as a holding mechanism configured to hold the operation lever 41 at the connector insertion completion position and a cancel mechanism configured to receive an operation force and cancel the holding state at the connector insertion completion position. Since the operation lever 41 is urged in a connector detachment and disconnection operation direction (an operation direction in which the connector 55 is detached from the connector of the main body device) by the torsion coil spring 42, the fastening state between the lever fastening unit 415 and the fastening piece 455 is cancelled, and the operation lever 41 rotates in the standing direction.

As described above, the fastening unit 221 of the attachment stage 20 is formed to protrude from the attachment surface 21 to the front side (to the side of the main body device). Further, the fastening unit 221 has a side end protrusion portion protruding from the side end of the attachment stage 20. The inclined surface 221s sliding on the inclined surface 321s of the fastening unit 321 formed on the side plate portion 32 of the slider 30 and performing conversion into the movement direction and a holding surface 221p continuous to the rear end side of the inclined surface 221s are formed on the back surface side of the side end protrusion portion. In the fastening unit 221, a hook unit 221f is formed at the lower end of the protrusion portion protruding from the attachment surface 21 to the front side.

At the rear side of the side end of the attachment stage 20, a fastening unit 222 for movably holding the side plate portion 32 of the slider 30 is formed in a protruding manner at a predetermined position with respect to the fastening unit 221. At the front surface side of the fastening unit 222, a holding surface 222p for holding the side plate portion 32 of the slider 30 and an inclined surface 222s continuous to the lower end side of the holding surface 222p are formed. This inclined surface 222s slides on the inclined surface 322s of the fastening unit 321 formed on the side plate portion 32 of the slider 30, so that the movement direction is converted.

The fastening unit 221 and the fastening unit 222 are used as a pair, so that the side plate portion 32 of the slider 30 is movably sandwiched by the fastening unit 221 and the fastening unit 222. Further, the inclined surfaces of the fastening unit 221 and the fastening unit 222 and the inclined surface of the fastening unit 321 provided on the side plate portion 32 of the slider 30 are caused to slide on each other, so that the movement of the slider 30 in the surface direction is converted into the movement of the connector in the insertion and detachment direction.

Figure 9:
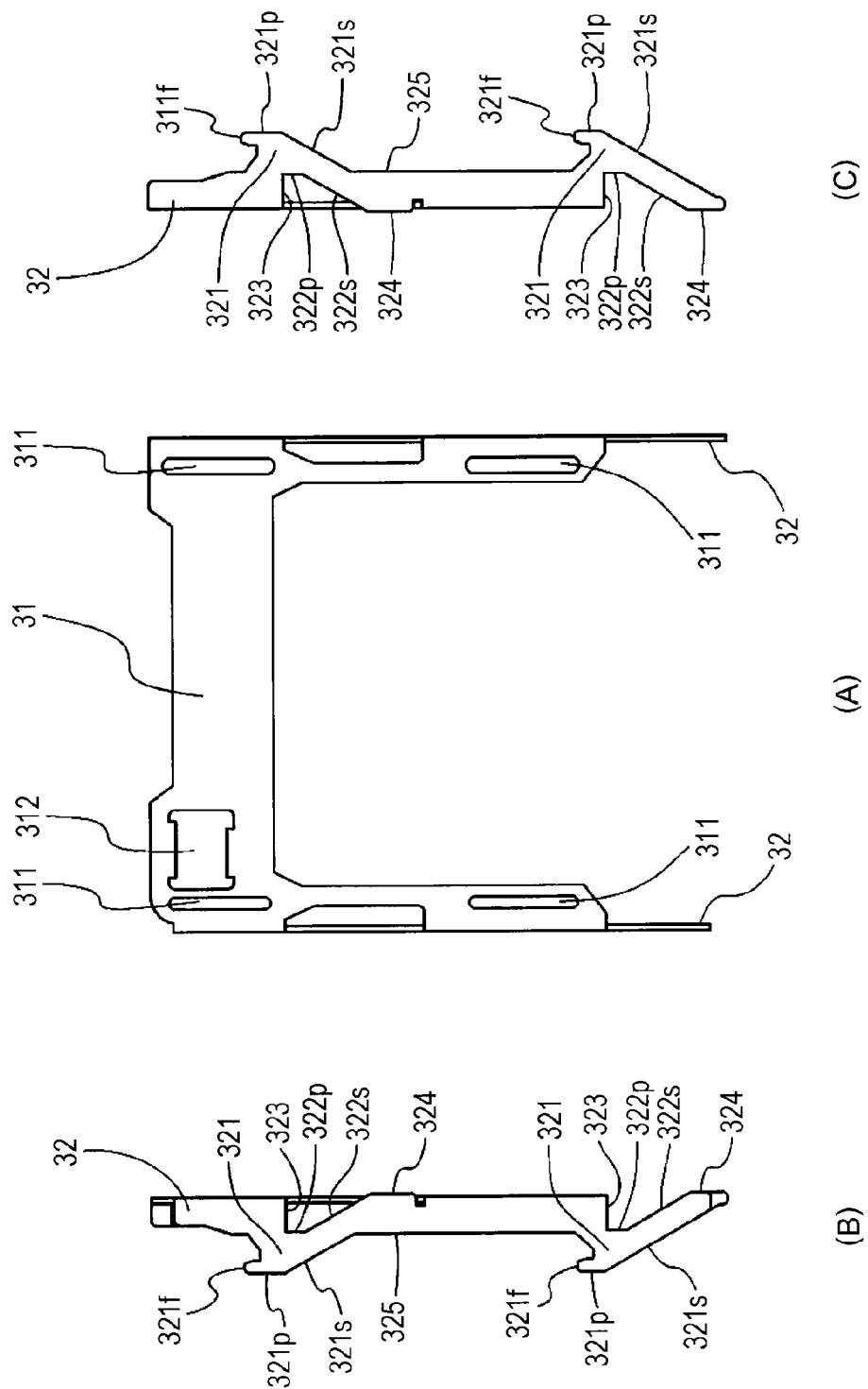
FIGS. 9(A) to 9(C) are a back view and side views of the slider.

FIGS. 9(A) to 9(C) are a back view and side views of the slider. The base body unit 31 of the slider 30 is formed with supported holes 311 so that the sliding pin 511 provided at the distal end of the support shaft 510 formed on the housing 50 is inserted into the supported hole 311. The base body unit 31 is formed with a driving shaft hole 312 into which the slider driving shaft 413 provided on the operation lever 41 is inserted.

The slider 30 is used in such a state that the sliding pin 511 is inserted into the supported hole 311, and the slider driving shaft 413 is inserted into the driving shaft hole 312. In this case, when the operation lever 41 receives user's operation force and rotates about the rotation shaft 23, the position of the slider driving shaft 413 moves in accordance with the rotation operation of the operation lever 41, and the slider 30 moves in the longitudinal direction of the supported hole 311.

More specifically, the operation lever 41 and the slider 30 constitute the first link mechanism for converting the movement in the operation direction into the movement in the surface direction, and when user's operation force on the operation lever 41 is received, the slider 30 is moved in the longitudinal direction of the supported hole 311.

On the right and left side plate portions 32 of the slider 30, fastening units 321 are formed. The fastening unit 321 is formed with the inclined surface for converting the movement in the surface direction into the movement in the insertion and detachment direction of the connector. More specifically, the inclined surface 321s is formed at the front side of the fastening unit 321 provided on the side plate portion 32, and the inclined surface 322s is formed at the rear side of the side plate portion 32. At an end portion at the front side of the inclined surface 321s, a holding surface 321p continuous to the inclined surface 321s is formed in a straight manner in the surface direction. At an end portion of the holding surface 321p, a hook unit 321f is formed. At an end portion at the front side of the inclined surface 322s, a holding surface 322p continuous to the inclined surface 322s is formed in a straight manner in the surface direction. Further, at an end portion side of the holding surface 322p, a fastening end 323 is provided in the vertical direction with respect to the holding surface 322p. The other end of the inclined surfaces 321s, 322s is configured to be continuous to flat surfaces 324, 325 in the surface direction.

In the slider 30, the side plate portion 32 is movably sandwiched by the fastening unit 221 and the fastening unit 222 provided on the attachment stage 20 and used as a pair. More specifically, the inclined surface 321s of the fastening unit 321 slides on the inclined surface 221s of the fastening unit 221, and the inclined surface 321s of the fastening unit 321 slides on the inclined surface 221s of the fastening unit 221, so that the slider 30 is movably attached to the attachment stage 20. At this occasion, the slider driving shaft 413 of the operation lever 41 is inserted into the driving shaft hole 312 provided on the base body unit 31 of the slider 30.

As described above, when the slider 30 is moved in the longitudinal direction of the supported hole 311 while the slider is attached to the attachment stage 20, the inclined surface 321s of the fastening unit 321 slides on the inclined surface 221s of the fastening unit 221. In accordance with the sliding operation of this inclined surface, the interval between the attachment stage 20 and the slider 30 is changed.

More specifically, the fastening unit 221, 222 of the attachment stages 20 and the side plate portion 32 of the slider 30 constitute the second link mechanism for converting the linear motion in the surface direction into the linear motion in a direction perpendicular to the surface direction. With this second link mechanism, the housing 50 moves, with respect to the attachment stage 20, in the insertion and detachment direction of the connector in accordance with the movement of the slider 30 in the surface direction.

Therefore, with the second link mechanism and the first link mechanism explained previously, user's operation force applied to the operation lever 41 is received, and the housing 50 attached with the connector can be moved in the connector insertion and detachment direction.

<2. Attachment and Detachment Operation of Adapter Device>

Figure 10:
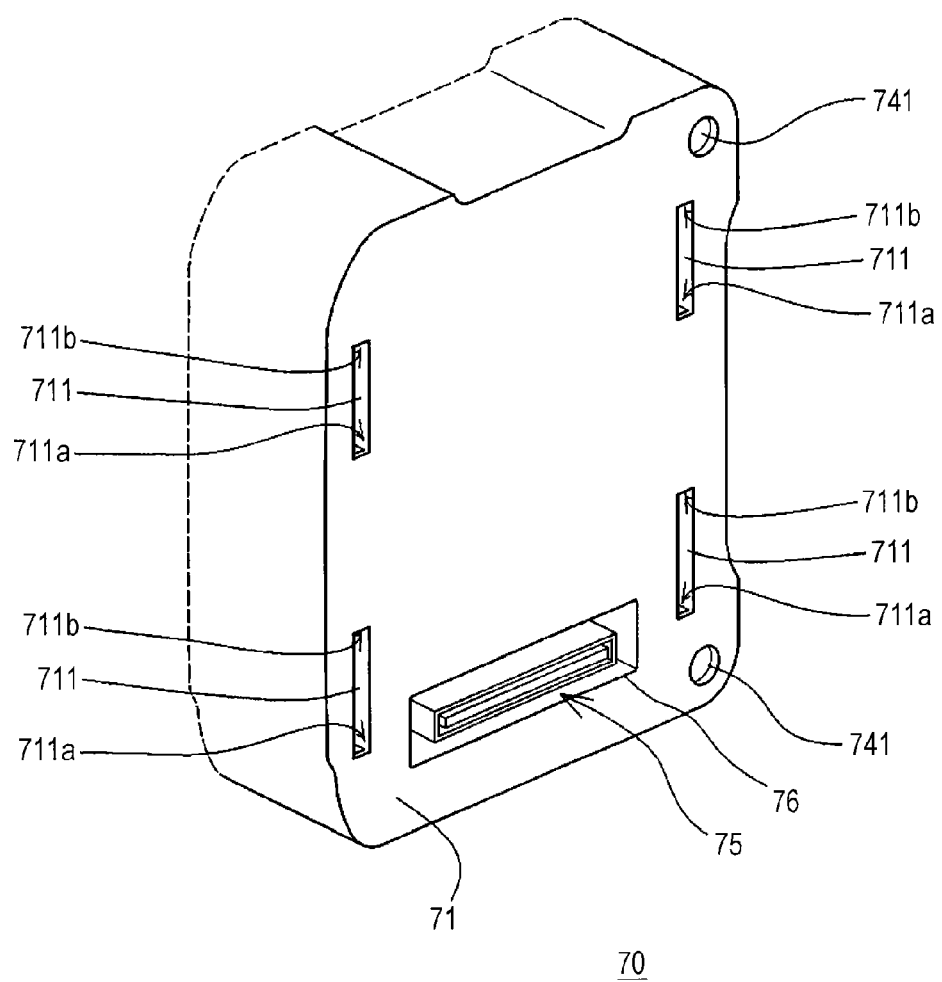
FIG. 10 is a perspective view showing an example of an attachment surface of an adapter device of a main body device.

Subsequently, the attachment and detachment operation of the adapter device will be explained. FIG. 10 is a perspective view showing an example of an attachment surface of an adapter device of the main body device. An attachment surface 71 is formed with fastening depression portions 711 at positions facing the fastening units 221 formed on the attachment stage 20 of the adapter device 10 and the hook units 321f provided on the fastening unit 321 of the slider 30. At the end portions of the fastening depression portion 711, a hook hole 711a fastened with the hook unit 221f formed on the fastening unit 221 and a hook hole 711b fastened with the hook unit 321f formed on the fastening unit 321 are provided. It should be noted that the main body device may be an electronic device connected to the adapter device via the connector, and may be a video camera device and the like having a dockable structure, or may be an information processing device, a terminal device, or the like.

In the attachment surface 71 of the main body device 70, an insertion port 76 into which the connector insertion guide 56 of the adapter device 10 is inserted is provided. The insertion port 76 is provided at a position facing the connector insertion guide 56 of the adapter device 10 in such a state that the hook unit 221f of the adapter device 10 is inserted into the hook hole 711a of the main body device 70 and the adapter device 10 is fastened to the main body device 70. The insertion port 76 is provided with a connector 75 coupled with the connector 55 of the adapter device 10.

Further, the attachment surface 71 of the main body device 70 is provided with a restriction depression portion 741 engaging with the restriction projection portion 641 at the position corresponding to the restriction projection portion 641 provided on the cover unit 60 of the adapter device 10 when the adapter device 10 is in the attachment position.

When the adapter device 10 is attached to the main body device 70, the operation lever 41 is in the standing state (see FIG. 1, FIGS. 2(A) and 2(B), FIGS. 7(A) to 7(C)). When the operation lever 41 is in the standing state, the holding surface 321p of the fastening unit 321 provided on the slider 30 (see FIGS. 9(A) to 9(C)) is at the position of the holding surface 221p of the fastening unit 221 of the attachment stage 20 (see FIGS. 8(A) to 8(C)), and the housing 50 is held at the position away from the attachment stage 20 to the back side. As described above, since the housing 50 is at the position away to the back side, the connector insertion guide 56 is not protruding from the attachment surface 21 of the attachment stage 20. It should be noted that the slider 30 is such that the sliding pin 511 comes into contact with the end portion of the supported hole and/or the fastening end 323 comes into contact with the fastening unit 222, so that the movement range of a direction (the direction opposite to an arrow MB direction explained later) is limited.

The user moves the operation lever 41 of the adapter device 10 into the standing state, the hook unit 221f of the fastening unit 221 provided on the attachment stage 20 is fastened to the hook hole 711a of the fastening depression portion 711 in the main body device 70. As described above, the hook unit 221f is fastened to the hook hole 711a, and accordingly, with respect to the main body device 70, the attachment stage 20 of the adapter device 10 is restricted in such a manner that the movement of the attachment stage 20 of the adapter device 10 in a direction perpendicular to the attachment surface 21 is restricted, and more specifically, the movement of the attachment stage 20 of the adapter device 10 in an insertion and detachment direction of the connector is restricted.

Figure 11:
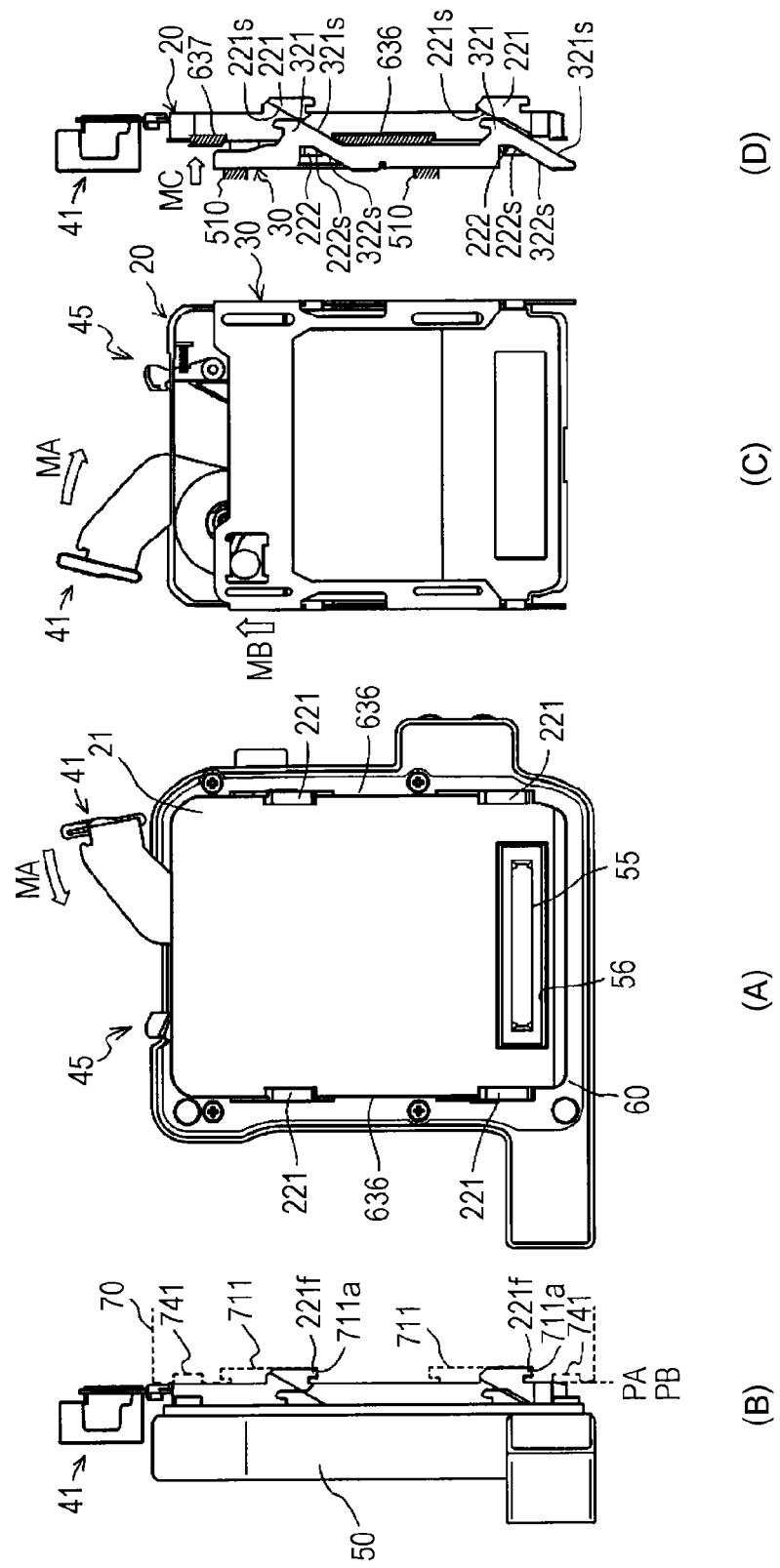
FIGS. 11(A) to 11(D) are figures for explaining operation when the adapter device is fastened to the main body device and operation of the operation lever is started.

FIGS. 11(A) to 11(D) are figures for explaining operation when the adapter device is fastened to the main body device and operation of the operation lever is started. FIG. 11(A) is a front view of the adapter device. FIG. 11(B) is a side view of the adapter device. FIG. 11(C) is a back view of the attachment stage. FIG. 11(D) is a side view of the attachment stage. In FIG. 11(B), a broken line shows the position of the main body device 70.

When the operation lever 41 is rotated in an arrow MA direction (collapsed direction) while the attachment stage 20 of the adapter device 10 is fastened to the main body device 70, the slider driving shaft 413 is moved in accordance with the lever operation, and as shown in FIG. 11(C), the slider 30 moves in an arrow MB direction. More specifically, with the first link mechanism explained above, the movement of the operation lever 41 is converted into the movement of the slider 30 in the surface direction. When the slider 30 is moved in the arrow MB direction, the inclined surfaces 321s, 322s of the fastening unit 321 slide on the inclined surface 221s of the fastening unit 221 and the inclined surface 222s of the fastening unit 222, and the slider 30 moves in an arrow MC direction as shown in FIG. 11(D). More specifically, with the second link mechanism explained above, the movement of the slider 30 in the surface direction is converted into the movement in the connector insertion direction. In this case, the cover unit 60 is fixed to the housing 50, and the slider 30 is held movably only in the hole direction of the supported holes 311 with respect to the housing 50 by the support shafts 510 of the housing 50 and the slider reception units 636, 637 of the cover unit 60. Therefore, when the slider 30 moves in the arrow MC direction, the housing 50 also moves in the arrow MC direction, and the connector 55 and the connector insertion guide 56 fixed to the housing 50 also move in the arrow MC direction, and more specifically, the connector 55 and the connector insertion guide 56 fixed to the housing 50 also move in the connector insertion direction. It should be noted that, the distal end of the connector insertion guide before the housing 50 moves is denoted as a position PA, and the attachment surface 71 of the main body device 70 is denoted as a position PB.

As described above, when the operation lever 41 is rotated in the collapsed direction while the attachment stage 20 of the adapter device 10 is fastened to the main body device 70, the housing 50 moves in the direction of the main body device 70 in accordance with the lever operation. Therefore, the connector 55 and the connector insertion guide 56 fixed to the housing 50 are moved in the connector insertion direction.

Figure 12:
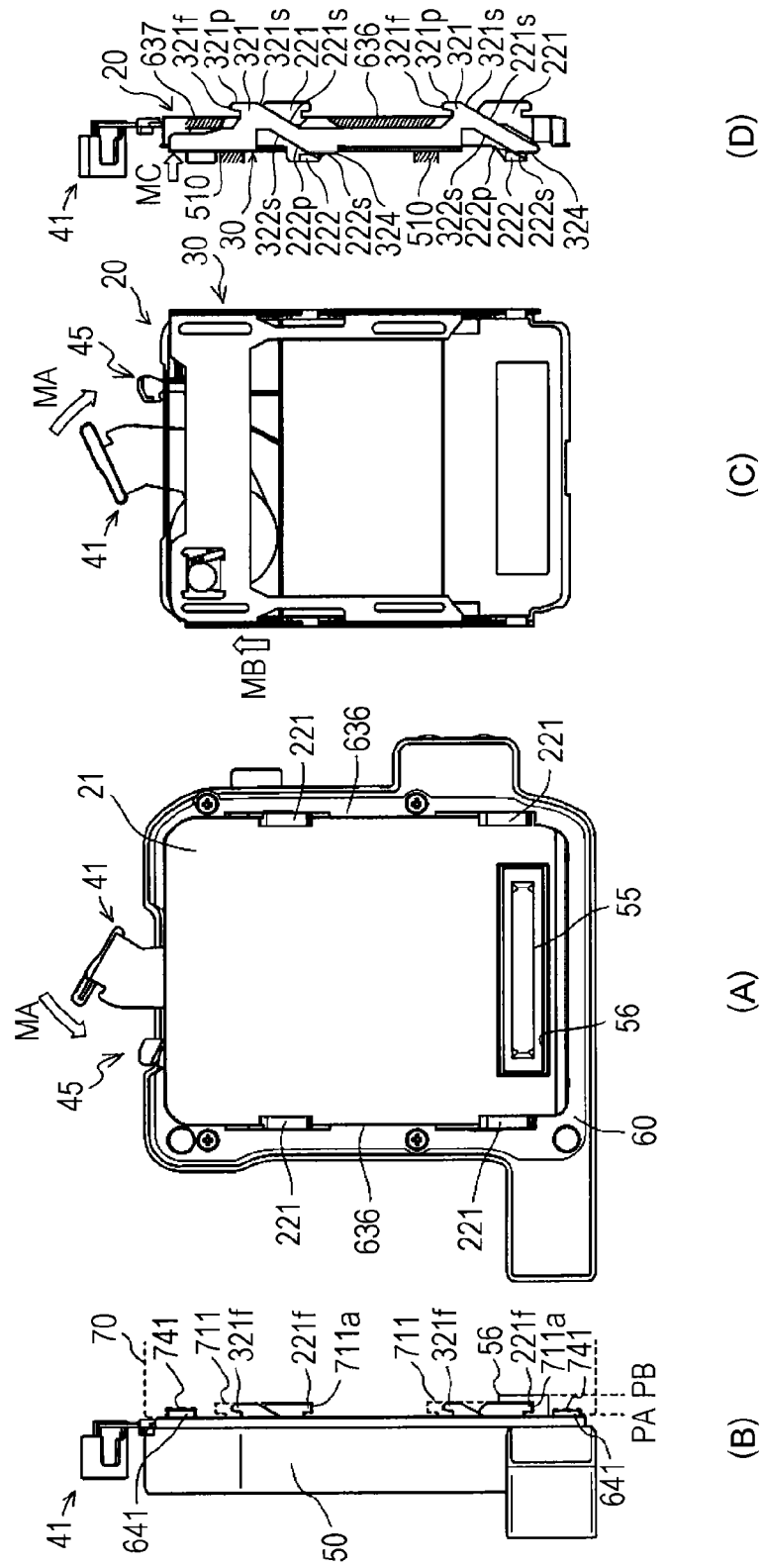
FIGS. 12(A) to 12(D) are figures for explaining operation in a case where the lever operation in the collapsed state is further performed.
Figure 13:
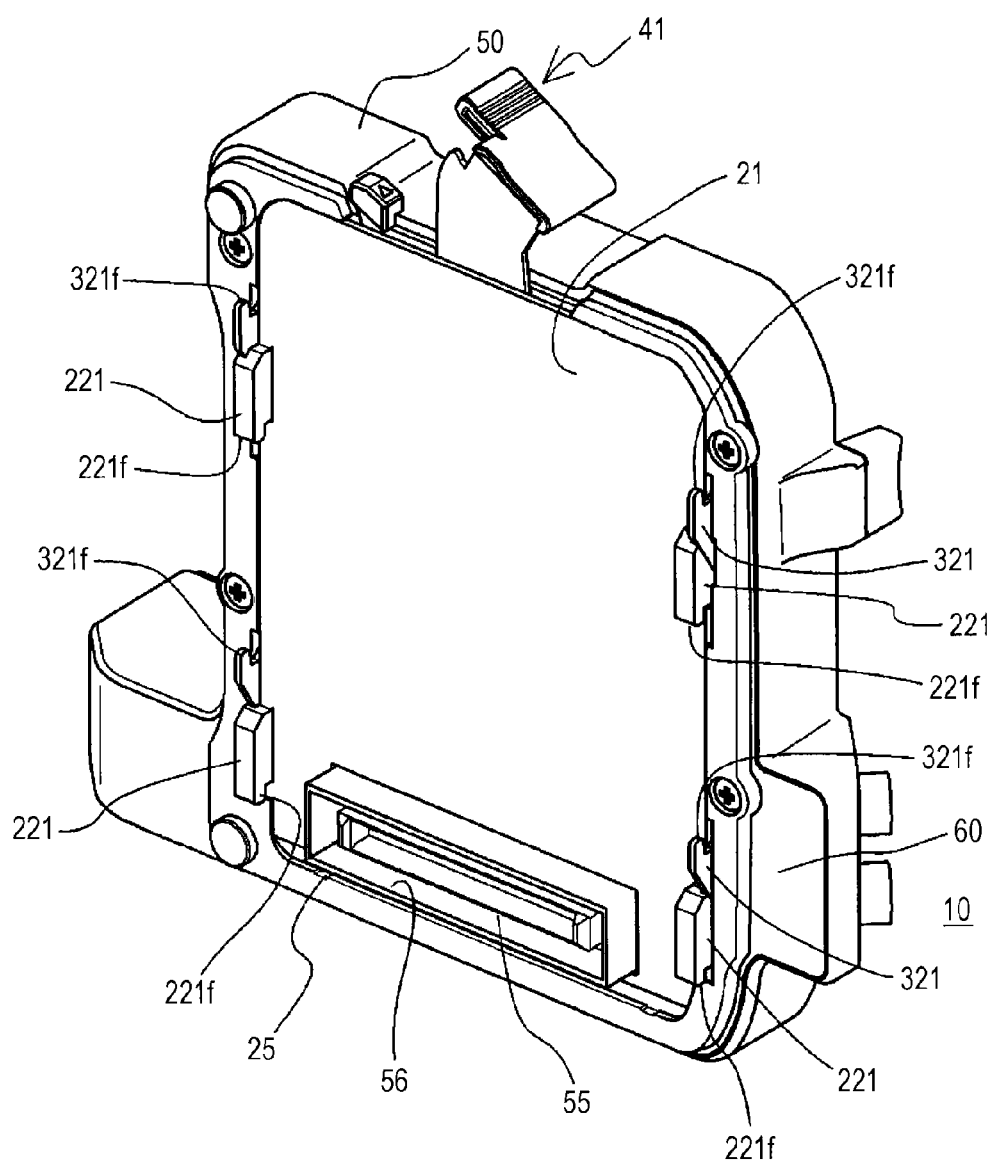
FIG. 13 is a perspective view of the adapter device when a lever operation is performed from the standing state to the collapsed state.

FIGS. 12(A) to 12(D) are figures for explaining operation in a case where the lever operation in the collapsed state is further performed. FIG. 12(A) is a front view of the adapter device. FIG. 12(B) is a side view of the adapter device. FIG. 12(C) is a back view of the attachment stage. FIG. 12(D) is a side view of the attachment stage. FIG. 13 shows a perspective view of the adapter device when a lever operation is performed from the standing state to the collapsed state.

When the operation lever 41 is operated in a direction of the collapsed state, the inclined surfaces 321s, 322s of the fastening unit 321 slide on the inclined surface 221s of the fastening unit 221 and the inclined surface 222s of the fastening unit 222, and the slider 30 moves in the direction of the attachment stage 20 as described above. Thereafter, the inclined surfaces 321s, 322s of the fastening unit 321 pass the inclined surfaces 221s, 222s of the fastening unit 221, and when the flat surfaces 324, 325 are at the positions of the holding surfaces 221p, 222p of the fastening unit 221, the movement in the direction of the attachment stage 20 of the slider 30 is stopped. More specifically, the interval from the holding surface 321p to the flat surface 324 in the attachment surface direction is the moving distance of the slider 30 in the attachment surface direction. For this reason, the housing 50 is moved in the connector insertion direction with respect to the attachment stage 20 by the moving distance, and the connector insertion guide 56 is in a state of protruding from the attachment surface 21 as shown in FIG. 13.

The hook unit 221f of the fastening unit 221 provided on the attachment stage 20 of the adapter device 10 is fastened to the hook hole 711a of the fastening depression portion 711 of the main body device 70, and the movement of the attachment stage 20 in the insertion and detachment direction of the connector is restricted with respect to the main body device 70. In this case, when the connector insertion guide 56 protrudes from the attachment surface 21 of the attachment stage 20, the connector insertion guide 56 is inserted into the insertion port 76 provided in the attachment surface 71 of the main body device 70. Therefore, the position PA at the distal end of the connector insertion guide 56 is at a position of the main body device 70 which is inner than the position PB of the attachment surface 71 of the main body device 70. As described above, the connector insertion guide 56 is inserted from insertion port 76 provided in the attachment surface 71 of the main body device 70, so that the connector 55 of the adapter device 10 and the connector 75 of the main body device 70 are configured to be at correct positions, and further, the housing 50 is moved in the connector insertion direction. Therefore, the connector 55 is accurately moved in the connector insertion direction to be coupled with the connector 75. Since the fastening unit 221 and the fastening unit 321 are provided at the upper and lower sides of the side end portions of the attachment stage 20, a substantially uniform force is applied to the housing 50 in a direction perpendicular to the attachment surface 21. Therefore, by applying substantially uniform force to the connector 55 of the adapter device 10 in the connector insertion direction, the connector 55 can be coupled with the connector 75 of the main body device 70.

When the housing 50 moves in the connector insertion direction, the restriction projection portion 641 provided on the cover unit 60 is engaged with the restriction depression portion 741 provided on the attachment surface 71 of the main body device 70. Therefore, even when a force in the surface direction is applied to the adapter device 10 attached to the main body device 70, the movement of the adapter device 10 in the surface direction can be restricted.

Figure 14:
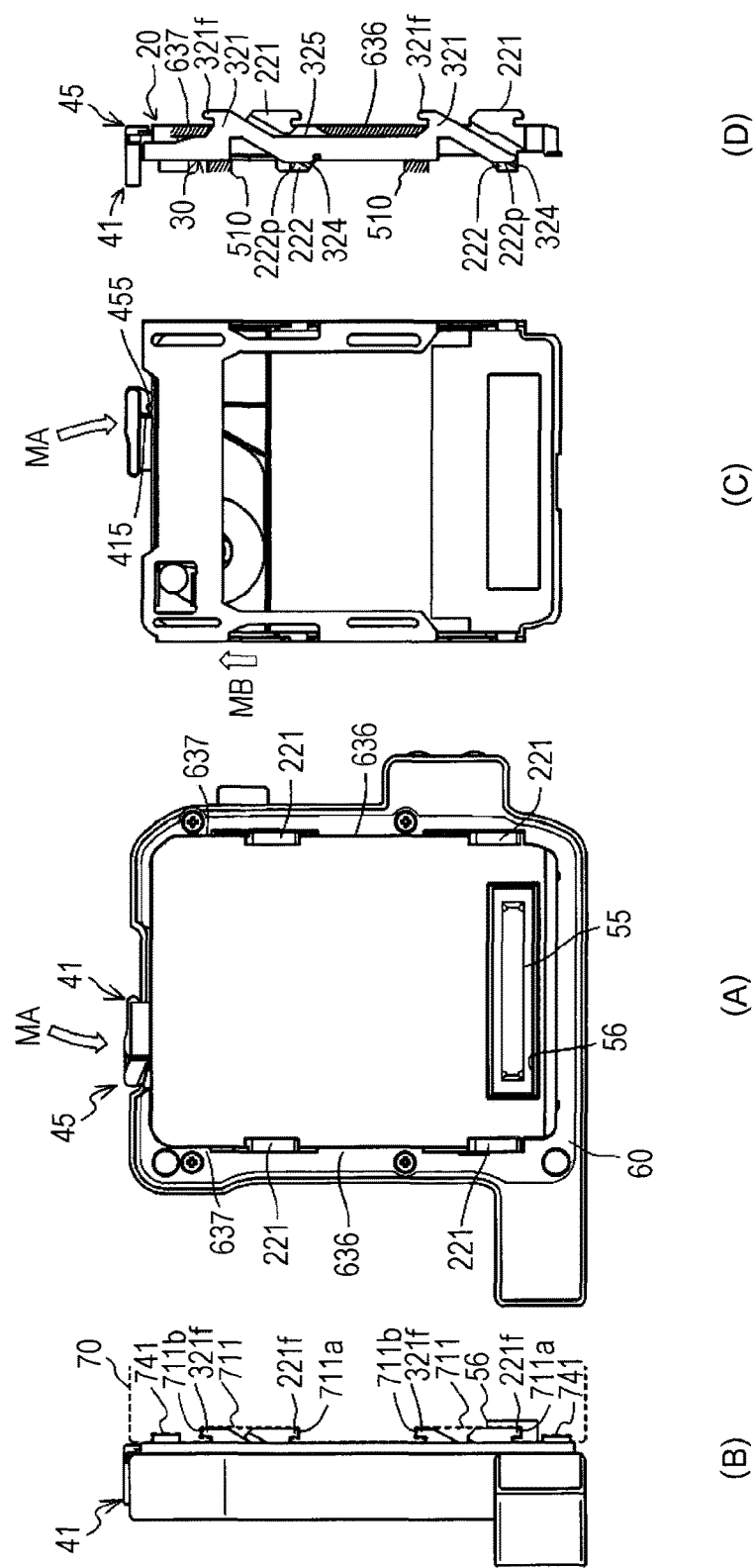
FIGS. 14(A) to 14(D) are figures for explaining operation in a case where the operation lever is caused to be in an inclined state.

FIGS. 14(A) to 14(D) are figures for explaining operation in a case where the operation lever is caused to be in an inclined state. FIG. 14(A) shows a front view of the adapter device. FIG. 14(B) shows a side view of the adapter device.

FIG. 14(C) shows a back view of the attachment stage. FIG. 14(D) shows a side view of the attachment stage.

When the operation lever 41 is operated in the arrow MA direction to be in the collapsed state, the slider driving shaft 413 moves in accordance with the lever operation, and the slider 30 is moved in the arrow MB direction. In this case, the slider 30 changes from the operation in which the inclined surface 322s slides on the inclined surface 222s of the fastening unit 222 to an operation in which the flat surface 324 slides on the holding surface 222p of the fastening unit 222. More specifically, the movement in the connector insertion direction is finished, and the connector is at the connector insertion completion position. With the slider 30, the flat surface 324 slides on the holding surface 222p of the fastening unit 222, and the hook unit 321f moves in the direction of the hook hole 711b of the fastening depression portion 711 of the main body device 70. Therefore, the hook unit 321f can be fastened to the main body device 70. When the slider 30 moves in the arrow MB direction, the slider 30 is held not only by the slider reception unit 636 but also by the slider reception unit 637. Therefore, the slider 30 can be held by the housing 50 and the cover unit 60 in a more reliable manner. As shown in FIG. 14(D), the slider 30 comes into contact with the end portions of the slider reception units 636, 637, so that the movement range in the other thereof (the arrow MB direction) is restricted.

When the operation lever 41 is in the collapsed state, the lever fastening unit 415 provided on the operation lever 41 is fastened to the fastening piece 455 of the lock cancel operation lever 45, so that the operation lever 41 is fixed so as not to be in the standing state. At this occasion, the hook unit 321f is in a state of being inserted into the hook hole 711a of the fastening depression portion 711 of the main body device 70. More specifically, the adapter device 10 is such that the hook unit 221f is inserted into the hook hole 711a of the fastening depression portion 711 of the main body device 70, and the hook unit 321f is in a state of being inserted into the hook hole 711b. More specifically, the hook unit 221f and the hook unit 321f are in such state that the hook unit 221f and the hook unit 321f are inserted into the hook holes in the directions opposite to each other, and the adapter device 10 can be reliably attached to the main body device 70.

Figure 15:
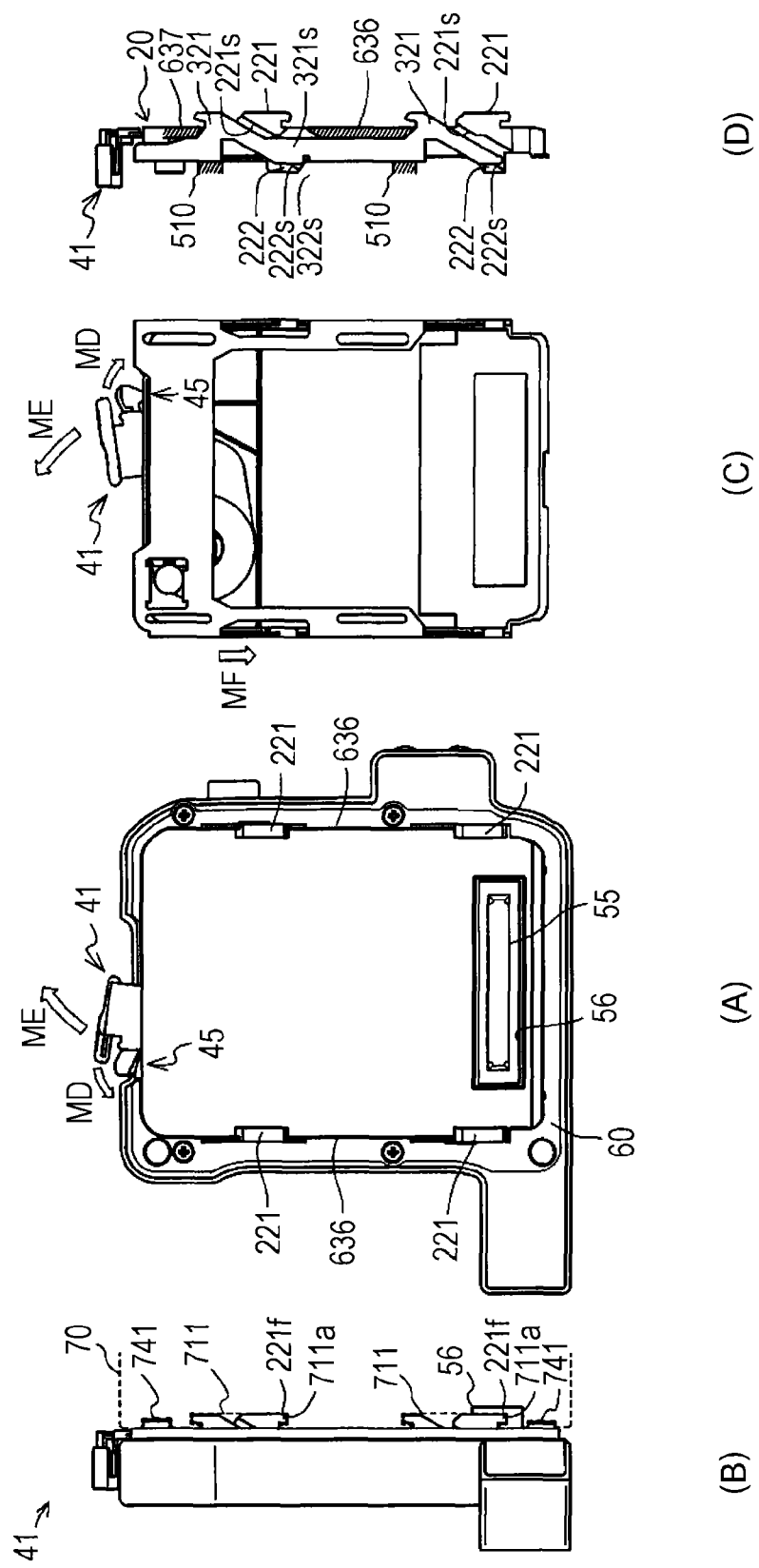
FIGS. 15(A) to 15(D) are figures for explaining operation in a case where the adapter device is detached from the main body device.

Subsequently, a case where the adapter device 10 is detached from the main body device 70 will be explained. FIGS. 15(A) to 15(D) are figures for explaining operation in a case where the adapter device is detached from the main body device. FIG. 15(A) shows a front view of the adapter device. FIG. 15(B) shows a side view of the adapter device. FIG. 15(C) shows a back view of the attachment stage. FIG. 15(D) shows a side view of the attachment stage.

When the adapter device 10 is detached from the main body device 70, the lock cancel operation lever 45 is rotated in the arrow MD direction which is a direction opposite to the direction of the operation lever 41. When the lock cancel operation lever 45 is rotated in the arrow MD direction, the fastening state between the lever fastening unit 415 of the operation lever 41 and the fastening piece 455 of the lock cancel operation lever 45 is cancelled. The operation lever 41 is urged in the standing direction by the torsion coil spring 42. Therefore, when the fastening state of the operation lever 41 with the lock cancel operation lever 45 is cancelled, the operation lever 41 is rotated in an arrow ME direction from the collapsed state by the urging force of the torsion coil spring 42. Therefore, with the rotation operation of the operation lever 41 in the arrow ME direction, the slider 30 moves in the arrow MF direction, and the hook unit 321f is detached from the hook hole 711b of the fastening depression portion 711 of the main body device 70.

Thereafter, when the operation lever 41 is further rotated in the arrow ME direction, the slider 30 moves in the arrow MF direction. At this occasion, the inclined surfaces 321s, 322s of the fastening unit 321 slide on the inclined surface 221s of the fastening unit 221 and the inclined surface 222s of the fastening unit 222, and the slider 30 moves in a direction perpendicular to the attachment surface 21 and away from the attachment surface 21. As described above, the slider 30 is restricted from moving in a direction perpendicular to the attachment surface 21 (the connector insertion and detachment direction). Therefore, the slider 30 as well as the housing 50 move in a direction away from the attachment surface 21 in a direction perpendicular thereto, and the connector 55 fixed to the housing 50 also moves away from the attachment surface 21 in a direction perpendicular thereto. More specifically, the movement of the slider 30 in the straight line direction is converted into the movement of the connector 55 in detachment and disconnection direction. Since the fastening units 221 and the fastening units 321 are provided at the upper and lower portions of the side end portions of the attachment stage 20, a substantially uniform force is applied to the housing 50 in a direction perpendicular to the attachment surface 21 but in a direction opposite to the direction during the adapter attachment. Therefore, by applying a substantially uniform force to the connector 55 of the adapter device 10 in the connector detachment and disconnection direction, the connector 55 of the adapter device 10 is detached from the connector 75 of the main body device 70.

As described above, according to the adapter device of the present technique, during the insertion and detachment of the connector, the force applied to the connector can be made into the substantially uniform force in the insertion and detachment direction. Therefore, the connector is not inserted or detached with an inclination with respect to the insertion and detachment direction, and any uneven force is not applied to the connector, and therefore, the reliability of the connection portion can be enhanced by preventing damage, deformation, contact failure, and the like of the connector.

Further, when the connector is attached, the fastening units provided on the adapter device 10 are inserted into the engagement holes of the main body device, and the fastening unit is in such a state that the hook units of which insertion directions are opposite to each other are inserted into the engagement holes. Therefore, the adapter device 10 can be reliably prevented from dropping from the main body device 70.

In the above embodiment explained above, for example, a configuration in which the housing having the connector is move forward and backward in the insertion and detachment direction of the connector in accordance with the rotation operation of the operation lever has been shown, but the user's operation direction is not limited to the above embodiment. For example, a movement direction conversion unit may be configured to convert user's slide operation in the main body device direction or a direction for inserting the hook unit 221f into the hook hole 711a into a movement of the connector in the insertion and detachment direction. More specifically, when the movement direction conversion unit is constituted by the first link mechanism and the second link mechanism, the first link mechanism converts the user's slide operation in the main body device direction or the direction for inserting the hook unit 221f into the hook hole 711a into a movement in the surface direction. In this case, when the hook unit 221f is inserted into the hook hole 711a, and the adapter device is fastened to the main body device, for example, the movement is converted into the movement in the surface direction in the direction opposite to the insertion direction of the hook unit 221f as described above. As described above, the second link mechanism may convert the movement in the surface direction into the movement in the connector insertion and detachment direction.

<3. Electronic Device Using Adapter Device>

Subsequently, a case where an electronic device using an adapter device, for example, an adapter device is used in an image-capturing device, will be explained.

Figure 16:
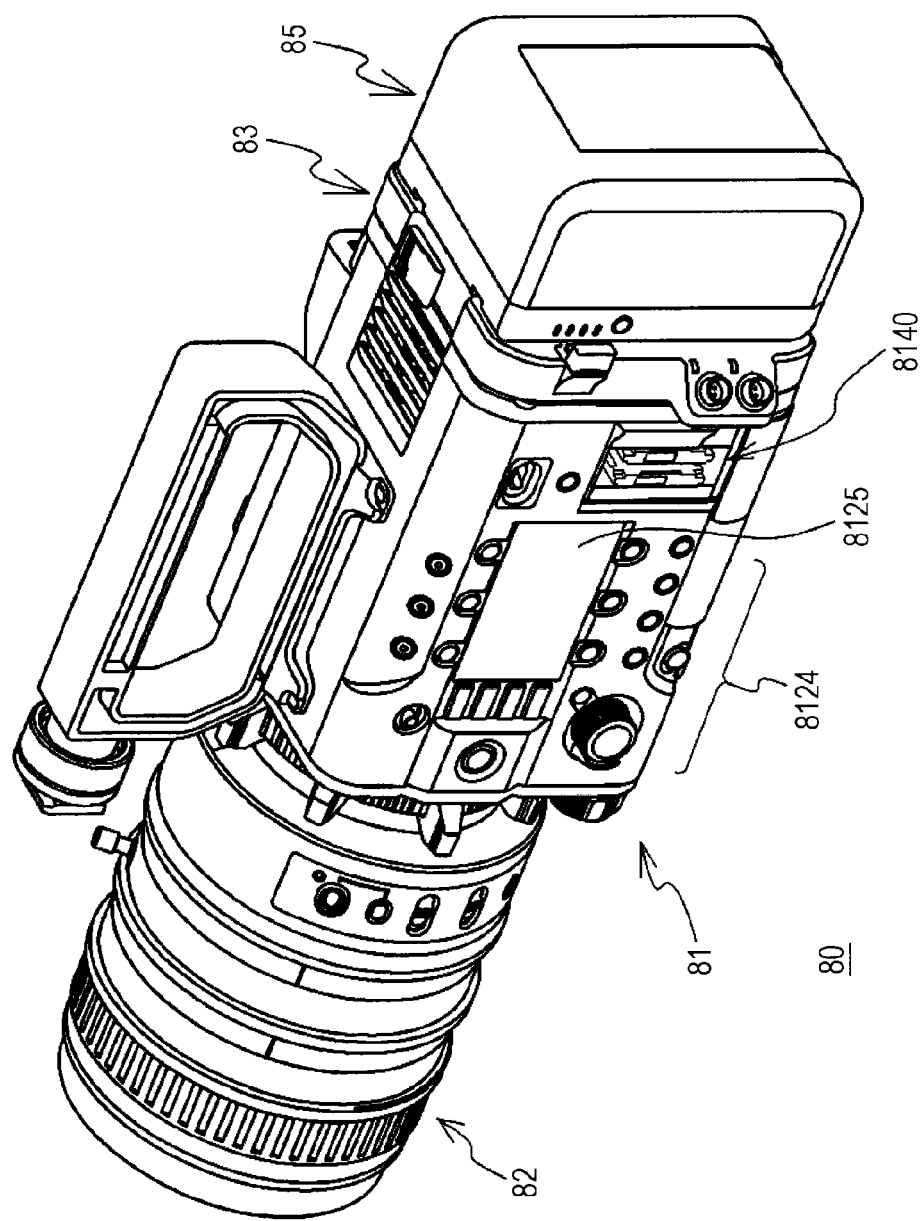
FIG. 16 is a perspective view showing an example of an external view of an image-capturing device using the adapter device (a case where the adapter device is applied to a battery pack connection device).
Figure 17:
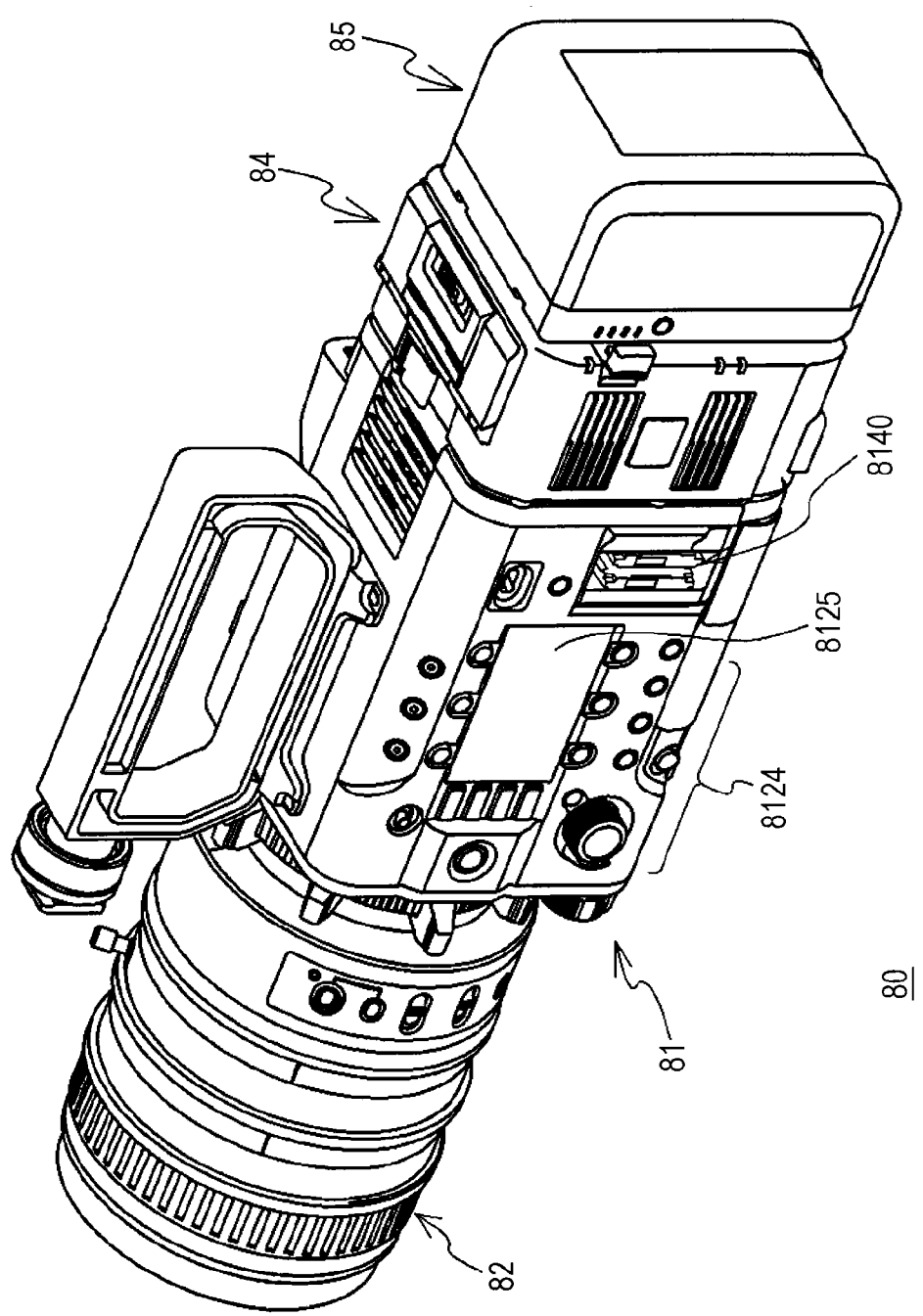
FIG. 17 is a perspective view showing an example of an external view of an image-capturing device using the adapter device (a case where the adapter device is applied to a recording and playback device).

FIGS. 16 and 17 are perspective views showing an example of an external view of an image-capturing device using an adapter device. FIG. 16 shows a case where the adapter device is applied to a battery pack connection device. FIG. 17 shows a case where the adapter device is applied to a recording and playback device.

In an image-capturing device 80, a lens unit 82 and the like are detachably attached to a front surface of an image-capturing device main body unit 81 (corresponding to the main body device of the electronic device). A user interface unit 8124, a display unit 8125, a recording medium insertion port 8140, and the like are provided at a left side surface of the image-capturing device main body unit 81. The user interface unit 8124 includes a switch, a button, a dial, and the like for performing selection, operation setting, and the like of various kinds of functions of image-capturing devices. The display unit 8125 displays the setting state, the operation state, and the like of the image-capturing device. A recording medium 91 used for image recording and the like is inserted into the recording medium insertion port 8140.

As shown in FIG. 16, the back surface of the image-capturing device main body unit 81 can be connected to a battery pack 85 via a battery pack connection device 83. As shown in FIG. 17, the back surface of the image-capturing device main body unit 81 can be connected to a recording and playback device 84, and the battery pack 85 can also be connected via the recording and playback device 84.

Figure 18:
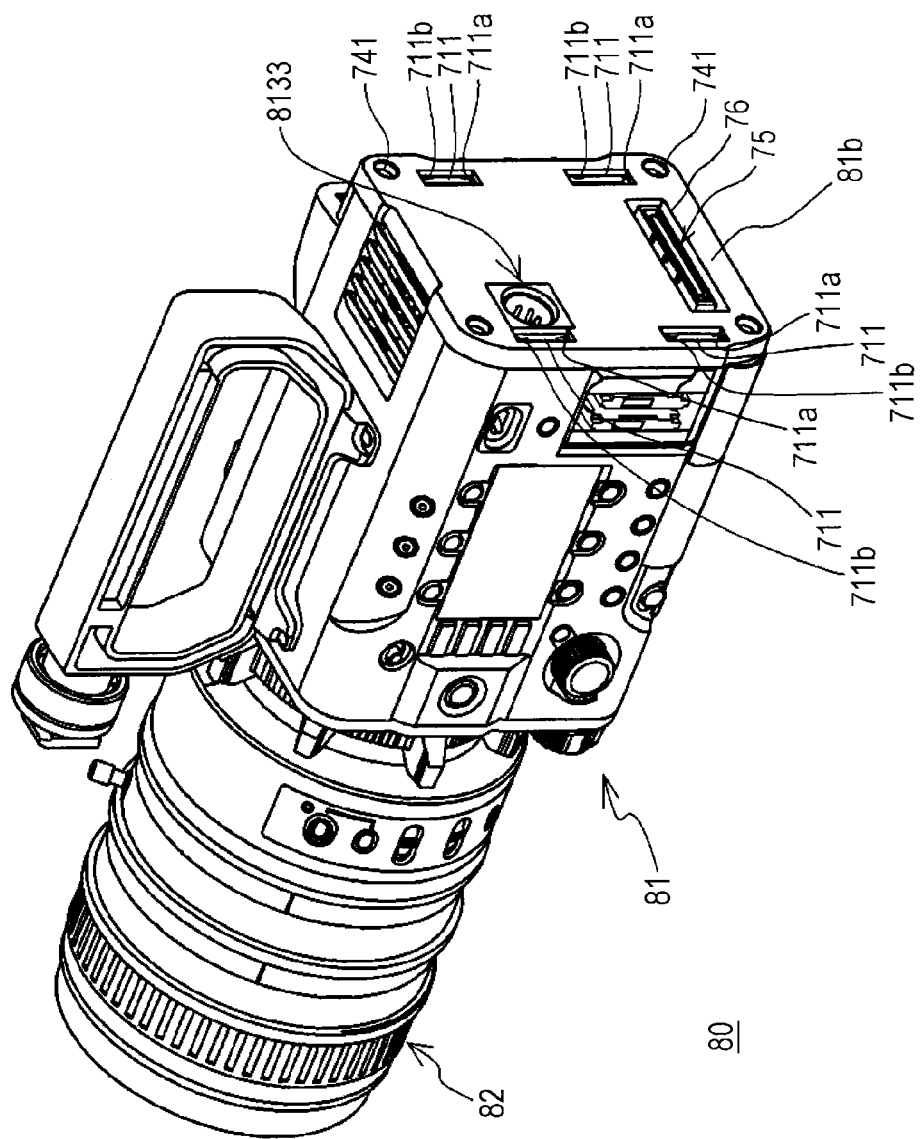
FIG. 18 is a perspective view showing a back surface of an image-capturing device main body unit.

FIG. 18 is a perspective view showing the back surface of the image-capturing device main body unit. The back surface 81b of the image-capturing device main body unit 81 is configured in the same manner as the attachment surface of the adapter device as shown in FIG. 10, and is formed with the fastening depression portion 711. The end portion of the fastening depression portion 711 is provided with the hook holes 711a, 711b. The back surface 81b is provided with the restriction depression portion 741 and the insertion port 76, and the insertion port 76 is provided with the connector 75. Further, the back surface 81b is provided with a power supply input connector 8133.

Figure 19:
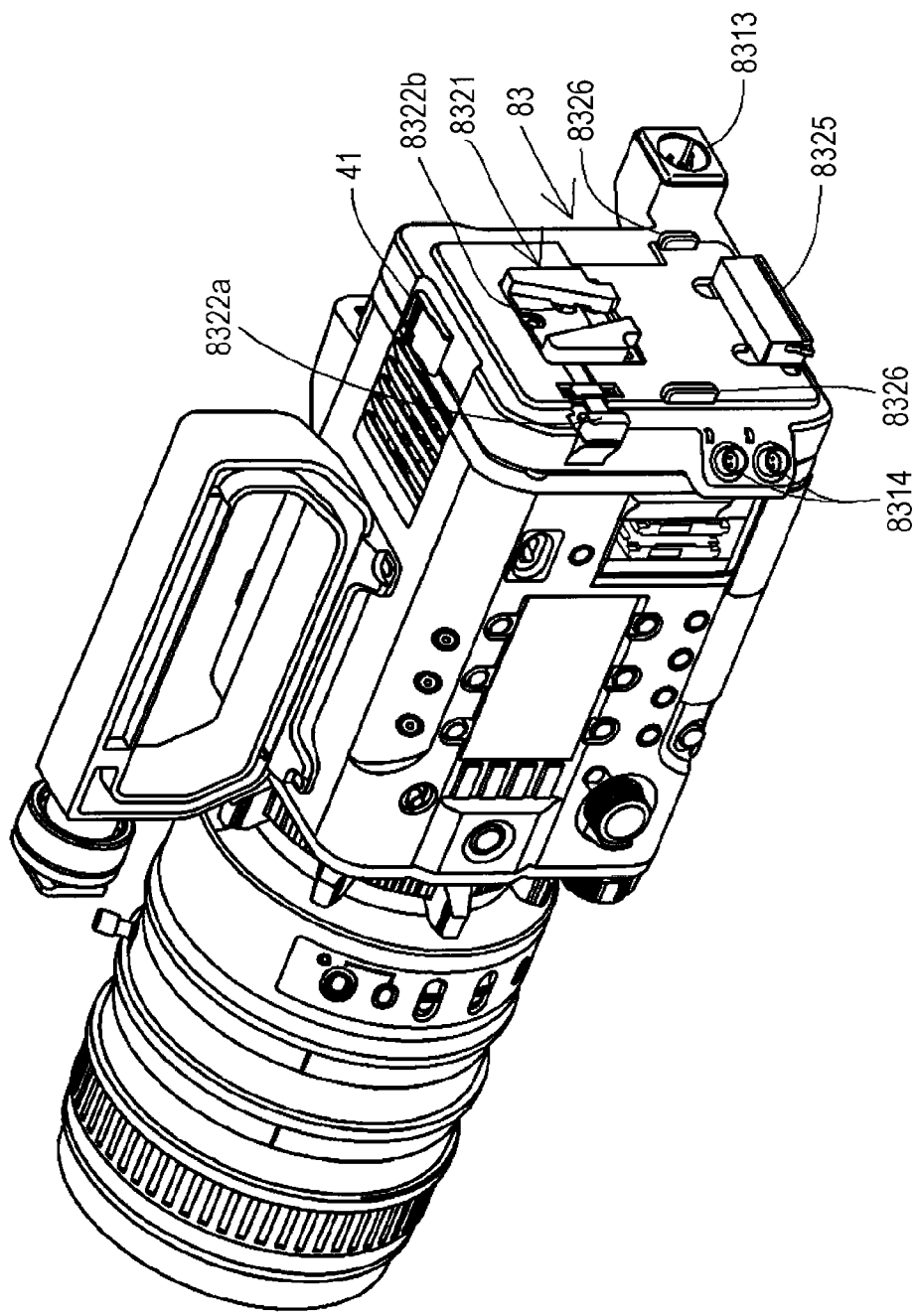
FIG. 19 is a perspective view showing a state where the battery pack connection device is connected to the back surface of the image-capturing device main body unit.
Figure 20:
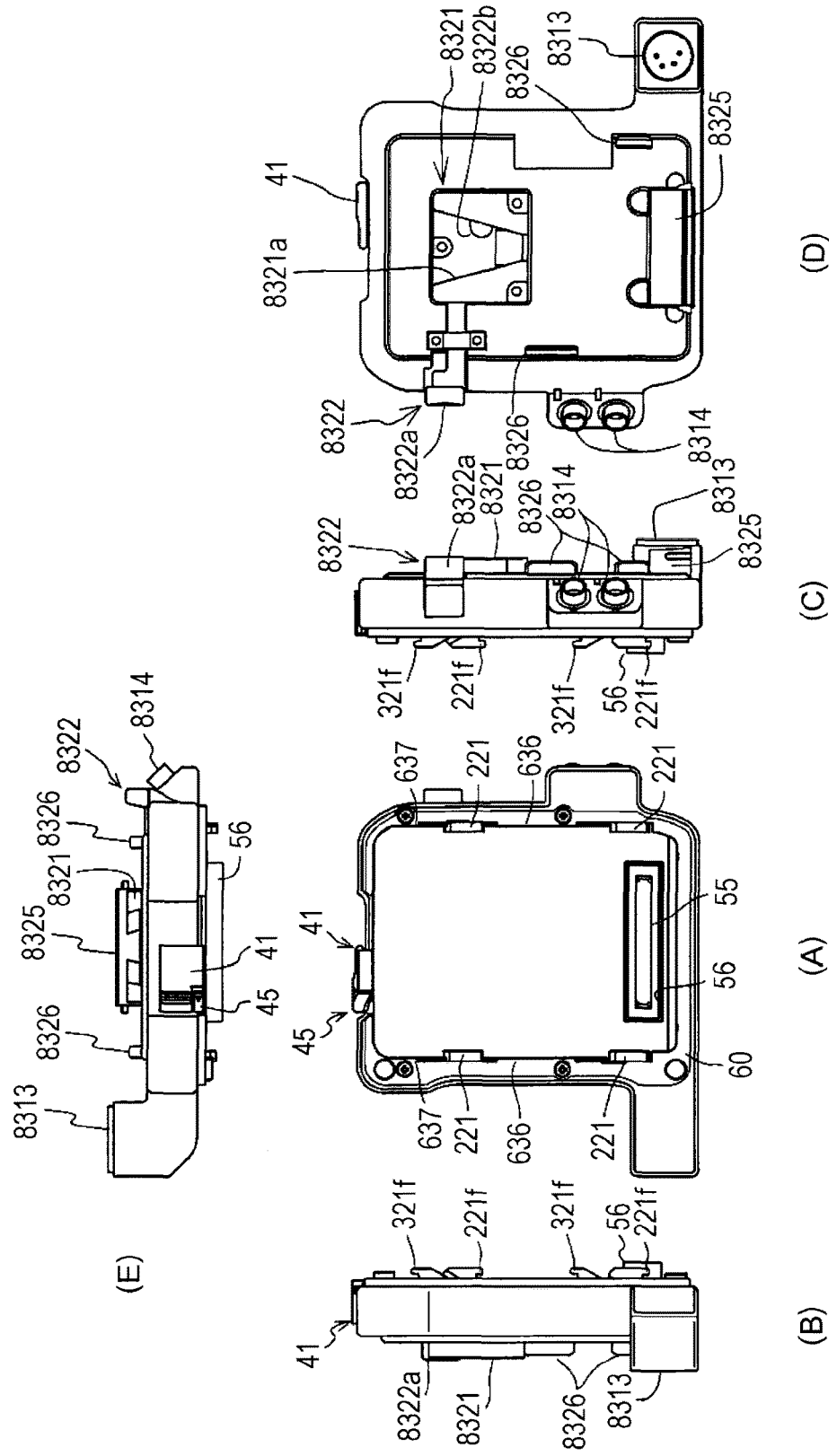
FIGS. 20(A) to 20(E) are figures showing an example of an external view of the battery pack connection device.

FIG. 19 is a perspective view showing a state where the battery pack connection device is connected to the back surface of the image-capturing device main body unit. FIG. 20(A) to 20(E) show an example of an external view of the battery pack connection device. FIG. 20(A) shows a surface of the battery pack connection device 83 facing the back surface 81b of the image-capturing device main body unit 81 (hereinafter referred to as a "main body attachment surface"). FIG. 20(B) shows a right side surface of the battery pack connection device 83 (a side at the right side surface of the image-capturing device main body unit when it is attached to the image-capturing device main body unit 81). FIG. 20(C) shows a left side surface of the battery pack connection device 83 (a side at the left side surface of the image-capturing device main body unit when it is attached to the image-capturing device main body unit 81). FIG. 20(D) shows a battery pack attachment surface which is a surface opposite to the main body attachment surface in the battery pack connection device 83. FIG. 20(E) shows an upper surface of the battery pack connection device 83.

As shown in FIG. 20(A), the main body attachment surface of the battery pack connection device 83 is configured in the same manner as the attachment surface side of the adapter device explained above (see FIGS. 2(A) and 2(B)). As shown in FIG. 19 and FIG. 20(C), the battery pack attachment surface of the battery pack connection device 83 is provided with a battery pack attachment unit 8321, a battery pack connector 8325, and position determination guides 8326. Further, as show in FIG. 20(C), a protrusion portion is provided at each of the right and left side surfaces of the battery pack connection device 83. One of the protrusion portions is provided with a power supply input connector 8313, and the other of the protrusion portions is provided with a power supply output connector 8314.

The battery pack attachment unit 8321 is formed with a holding depression portion 8321a substantially in a V shape. The holding depression portion 8321a has, for example, a cross section in a trapezoid, and an opening side is formed to be narrower than the side of the battery pack connection device. One of the end portions of a release lever 8322 is an operation unit 8322a operated by the user, and the other of the end portions is a fastening claw 8322b protruding from the inner side surface of the holding depression portion 8321a. The release lever 8322 is urged in a direction in which the fastening claw 8322b protrudes from the side surface of the holding depression portion 8321a (for example, a direction in which it protrudes from the left side surface of the battery pack connection device 83). The release lever 8322 is configured such that when a user and the like operate the operation unit 8322a in a direction opposite to the urging force direction, the fastening claw 8322b protruding from the side surface of the holding depression portion 8321a moves in a direction opposite to the protruding direction.

The battery pack connector 8325 is provided at a position corresponding to the connection terminal of the battery pack 85 when a position determination groove 8526 of the battery pack 85 is engaged with the position determination guide 8326 of the battery pack attachment unit 8321.

The position determination guide 8326 is formed to protrude from the battery pack attachment surface in the connector insertion direction of the battery pack connector 8325 so as to restrict the battery pack 85 to a predetermined position when the battery pack 85 is attached to the battery pack connection device 83.

The power supply input connector 8313 and the power supply output connector 8314 are provided at protrusion portions on right and left side surfaces. Therefore, even when the battery pack 85 is connected to the battery pack connection device 83, the power supply input connector 8313 and the power supply output connector 8314 can be used.

Figure 21:
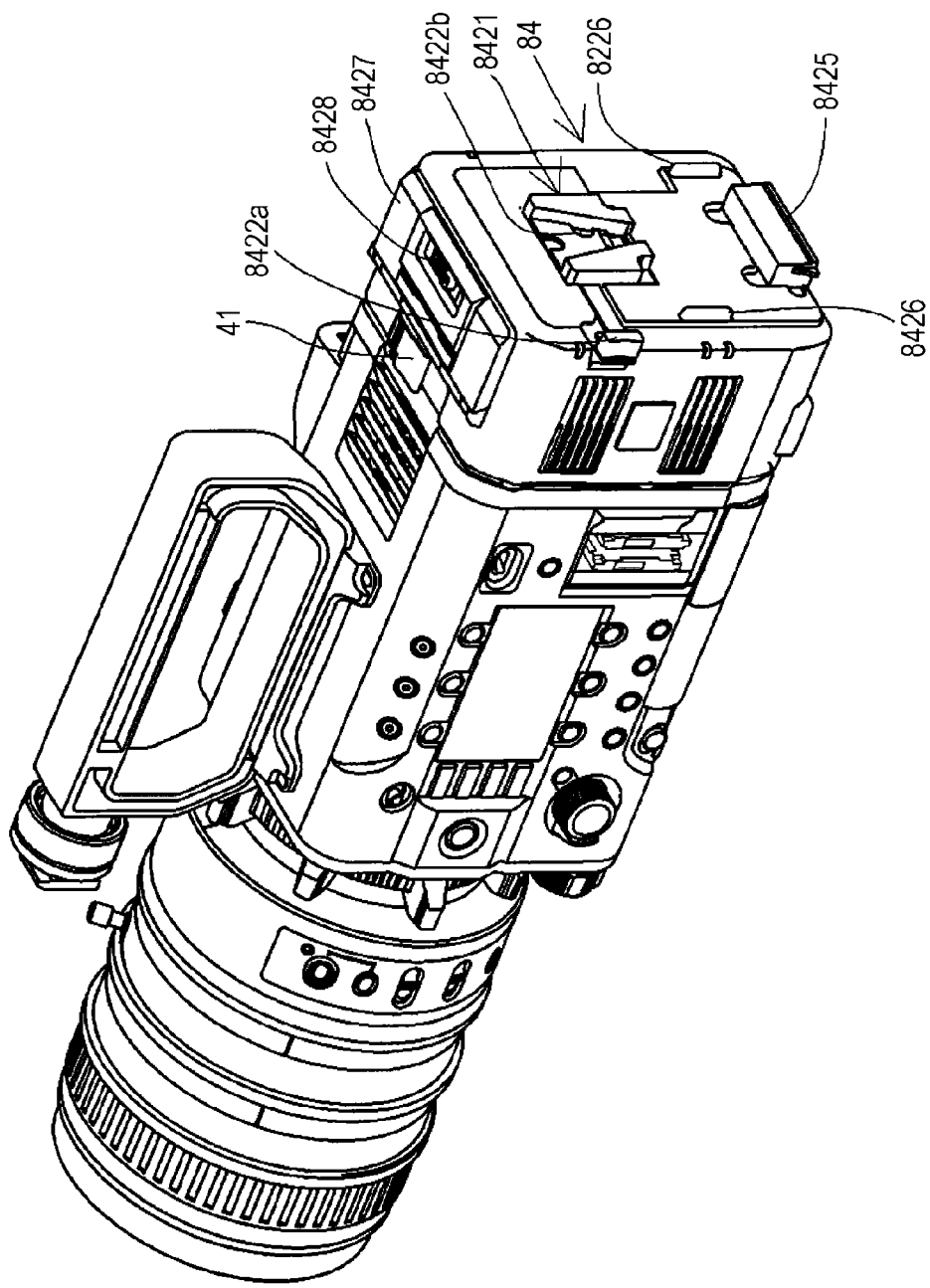
FIG. 21 is a perspective view showing a state where the recording and playback device is attached to the back surface of a body unit.

FIG. 21 is a perspective view showing a state where the recording and playback device is attached to the back surface of the image-capturing device main body unit. FIGS. 22(A) to 22(E) show an example of an external view of the recording and playback device. FIG. 22(A) shows a surface of the recording and playback device 84 facing the back surface 81b of the image-capturing device main body unit 81 (hereinafter referred to as a "main body attachment surface"). FIG. 22(B) shows a right side surface of the recording and playback device 84 (a side at the right side surface of the image-capturing device main body unit when it is attached to the image-capturing device main body unit 81). FIG. 22(C) shows a left side surface of the recording and playback device 84 (a side at the left side surface of the image-capturing device main body unit when it is attached to the image-capturing device main body unit 81). FIG. 22(D) shows a battery pack attachment surface which is a surface opposite to the main body attachment surface in the recording and playback device 84. FIG. 22(E) shows an upper surface of the recording and playback device 84.

As shown in FIG. 22(A), the main body attachment surface of the recording and playback device 84 is configured in the same manner as the attachment surface side of the adapter device explained above (see FIGS. 2(A) and 2(B)). As shown in FIG. 21 and FIG. 22(C), the battery pack attachment surface of the recording and playback device 84 is provided with a battery pack attachment unit 8421, a battery pack connector 8425, and position determination guides 8426. Further, as show in FIG. 22(C), a right side surface of the recording and playback device 84 is provided with a power supply input connector 8413, a power supply output connector 8414, and a signal output terminal 8415.

The battery pack attachment unit 8421 is formed with a holding depression portion 8421a substantially in a V shape. The holding depression portion 8421a has, for example, a cross section in a trapezoid, and an opening side is formed to be narrower than the side of the recording and playback device. One of the end portions of a release lever 8422 is an operation unit 8422a operated by the user, and the other of the end portions is a fastening claw 8422b protruding from the inner side surface of the holding depression portion 8421a. The release lever 8422 is urged in such a manner that the fastening claw 8422b protrudes from the side surface of the holding depression portion 8421a. The release lever 8422 is urged in a direction in which the fastening claw 8422b protrudes from the side surface of the holding depression portion 8421a (for example, a direction in which it protrudes from the left side surface of the recording and playback device 84). The release lever 8422 is configured such that when a user and the like operates the operation unit 8422a in a direction opposite to the urging force direction, the fastening claw 8422b protruding from the side surface of the holding depression portion 8421a moves in a direction opposite to the protruding direction.

The battery pack connector 8425 is provided at a position corresponding to the connection terminal of the battery pack 85 when the position determination groove 8526 of the battery pack 85 is engaged with the position determination guide 8426 of the battery pack attachment unit 8421.

The position determination guide 8426 is formed to protrude from the battery pack attachment surface in the connector insertion direction of the battery pack connector 8425 so as to restrict the battery pack 85 to a predetermined position when the battery pack 85 is attached to the recording and playback device 84.

The power supply input connector 8413, the power supply output connector 8414, and the signal output terminal 8415 are provided on the side surface of the recording and playback device 84. Therefore, even when the battery pack 85 is connected to the recording and playback device 84, the power supply input connector 8413, the power supply output connector 8414, and the signal output terminal 8415 can be used.

On the upper surface of the recording and playback device 84, an insertion port open/close lid 8427 covering a recording medium insertion port (not shown) is provided. The insertion port open/close lid 8427 is provided with an operation lever 8428, and with the operation lever 8428, for example, the insertion port open/close lid 8427 can be fixed in the closed state. When the user uses the recording and playback device 84, the insertion port open/close lid 8427 is caused to be in an open state, and the user inserts a recording medium 92 into the insertion port. Thereafter, the user causes the insertion port open/close lid 8427 to be in the closed state, and the recording medium 92 is recorded and played back. When the user operates the operation lever 8428 and causes the insertion port open/close lid 8427 to be in the open state, the user can retrieve the recording medium 92 inserted therein.

Figure 23:
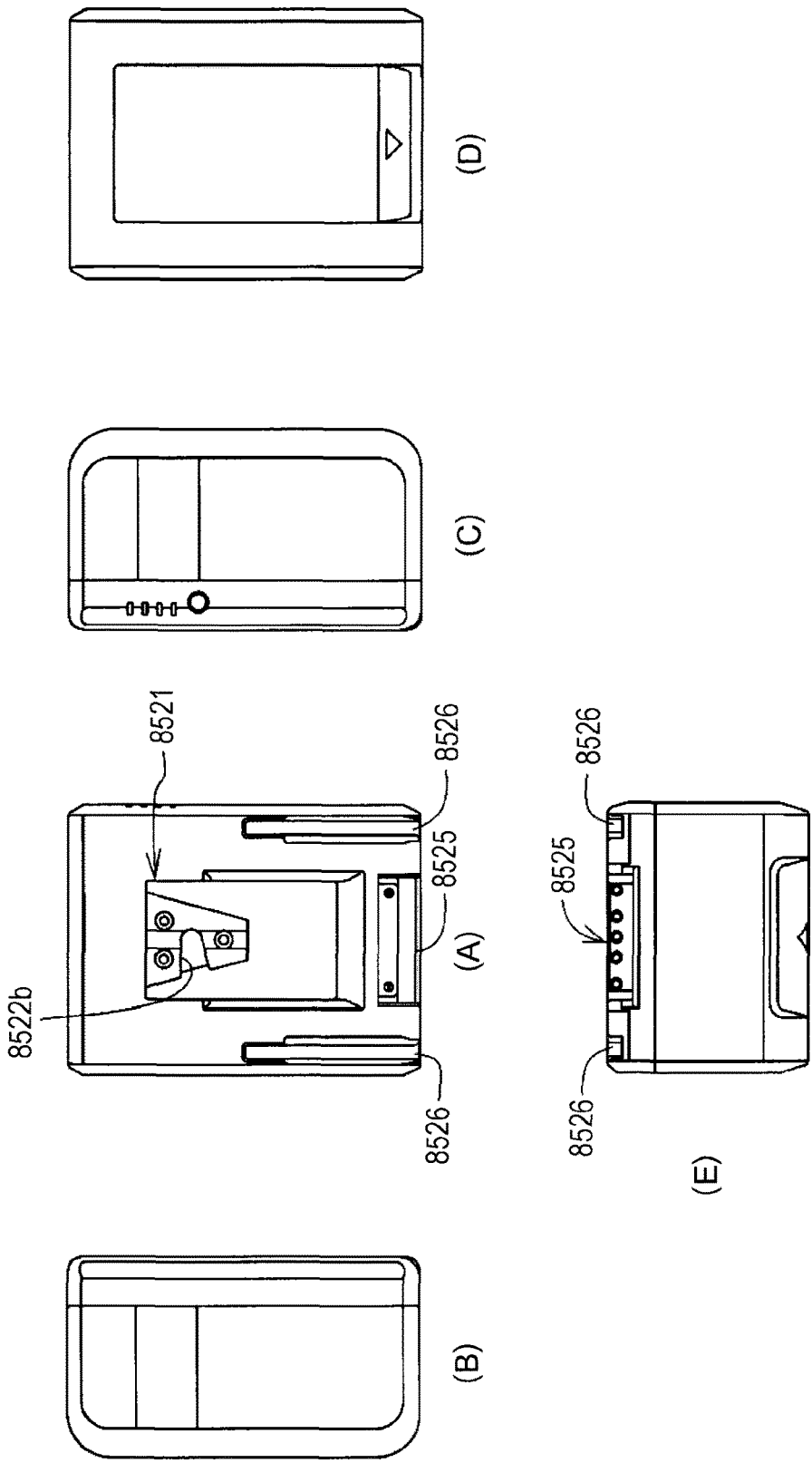
FIGS. 23(A) to 23(E) show an example of an external view of a battery pack.

FIGS. 23(A) to 23(E) show an example of an external view of a battery pack. FIG. 23(A) shows an attachment surface of the battery pack 85 facing the battery pack attachment surface of the battery pack connection device 83 or the recording and playback device 84. FIG. 23(B) shows a right side surface of the battery pack 85 (a side at the right side surface of the image-capturing device main body unit when it is attached to the image-capturing device main body unit 81). FIG. 23(C) shows a left side surface of the battery pack 85 (a side at the left side surface of the image-capturing device main body unit when it is attached to the image-capturing device main body unit 81). FIG. 23(D) shows a back surface of the battery pack 85. FIG. 22(E) shows a lower surface of the battery pack 85.

As shown in FIG. 23(A), the attachment surface of the battery pack 85 is provided with a fastening projection portion 8521, a connection terminal unit 8525, and a position determination groove 8526.

The fastening projection portion 8521 is substantially in a character shape corresponding to the holding depression portion 8321a of the battery pack attachment unit 8321 of the battery pack connection device 83 or the holding depression portion 8421a of the battery pack attachment unit 8421 of the recording and playback device 84. The fastening projection portion 8521 has, for example, a cross section in a trapezoid, and a distal end side is formed to be wider than the side of the battery pack. The side surface of the fastening projection portion 8521 is provided with a fastening claw holding unit 8522b into which the fastening claw 8322b (8422b) of the release lever 8322 (8422) is inserted. Therefore, when the fastening projection portion 8521 is inserted into the holding depression portion 8321a (8421a), the battery pack 85 is restricted from moving in a direction perpendicular to the attachment surface. The fastening claw 8322b (8422b) of the release lever 8322 (8422) is inserted into the fastening claw holding unit 8522b, the battery pack 85 is fixed with the battery pack connection device 83 or the recording and playback device 84 in an integrated state.

The connection terminal unit 8525 includes a terminal for providing electric power from the battery pack 85 to the image-capturing device main body unit and the like, a terminal for, e.g., performing communication with regard to the charge and discharge operation and the like of the battery pack, and the like.

The position determination grooves 8526 are formed in an insertion and detachment direction of the connection terminal unit 8525 for the connector extending from the lower end of the battery pack 85. The interval and the groove width of the position determination grooves 8526 are formed in association with the position determination guides 8326 (8426). Therefore, when the battery pack 85 is slid so that the position determination guides 8326 (8226) slide on the position determination grooves 8526, the connection terminal unit 8525 can be correctly inserted into and detached from the connector.

Figure 24:
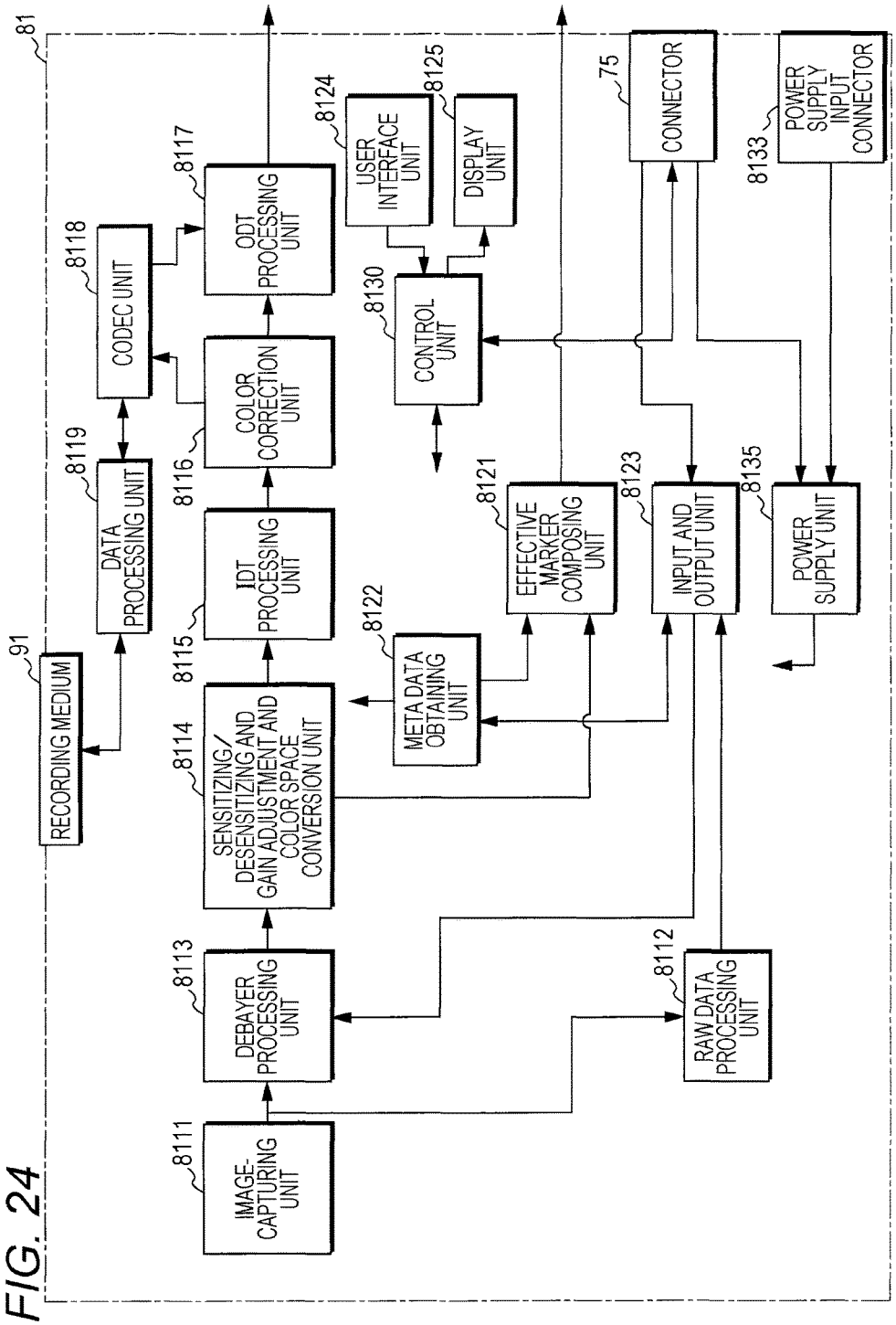
FIG. 24 is a figure schematically showing an example of a circuit configuration of an image-capturing device.

Subsequently, a circuit configuration of an image-capturing device main body unit will be explained. FIG. 24 schematically shows an example of a circuit configuration of an image-capturing device main body unit. The image-capturing device main body unit 81 includes an image-capturing unit 8111, a RAW data writing unit 8112, a debayer processing unit 8113, a sensitizing/desensitizing and gain adjustment and color space conversion unit 8114, an input device transform (IDT) processing unit 8115, a color correction unit 8116, an onput device transform (ODT) processing unit 8117, a codec unit 8118, and a data processing unit 8119. The image-capturing device main body unit 81 includes an effective marker composing unit 8121, a meta data obtaining unit 8122, an input and output unit 8123, a user interface unit 8124, a display unit 8125, a control unit 8130, and a power supply unit 8135. Further, the image-capturing device main body unit 81 includes a power supply input connector 8133 and a connector 75.

The image-capturing device may be constituted by a computer system including a central processing unit (CPU), a read only memory (ROM), a random access memory (RAM), a storage, and the like, not shown. In this case, by causing the CPU to execute a program stored in a memory, a storage, and the like, the computer system is caused to operate as the RAW file writing unit 8112, the debayer processing unit 8113, the sensitizing/desensitizing and gain adjustment and color space conversion unit 8114, the IDT processing unit 8115, the color correction unit 8116, the ODT processing unit 8117, the codec unit 8118, the data processing unit 8119, the effective marker composing unit 8121, the meta data obtaining unit 8122, and the like.

The image-capturing unit 8111 is constituted by using an image-capturing device such as a complementary metal oxide semiconductor (CMOS) and a charge coupled device (CCD), and generates RAW data of a captured image.

The RAW data writing unit 8112 performs gain adjustment on RAW data obtained by the image-capturing unit 8111 on the basis of exposure index of photo meter (EI) and processing for converting RAW data obtained by the image-capturing unit 8111 into predetermined color space. The RAW data writing unit 8112 outputs the processed RAW data to the input and output unit 8123. The debayer processing unit 8113 performs color interpolation and the like on RAW data obtained by the image-capturing unit 8111, and generates an RGB image (image data).

The sensitizing/desensitizing and gain adjustment and color space conversion unit 8114 performs sensitizing processing, desensitizing processing, and the like on image data obtained by the debayer processing unit 8113. The sensitizing/desensitizing and gain adjustment and color space conversion unit 8114 performs gain adjustment on image data having been subjected to the sensitizing processing and desensitizing processing on the basis of meta data obtained by the meta data obtaining unit 8122. The sensitizing/desensitizing and gain adjustment and color space conversion unit 8114 performs gain adjustment on the basis of, for example, white balance and imager sensitivity (ISO Sensitivity) and exposure index of photo meter (EI), and converts image data in a color space of the image-capturing unit 8111 into image data in a standard color space.

The IDT processing unit 8115 converts image data which is output by the sensitizing/desensitizing and gain adjustment and color space conversion unit 8114 into values for color adjustment using ASC-CDL on the basis of meta data obtained by the meta data obtaining unit 8122. The IDT processing unit 8115 performs conversion on the basis of, for example, capture gamma equation and gamma for CDL.

The color correction unit 8116 performs color correction by applying ASC-CDL obtained by the meta data obtaining unit 8122 to image data converted by the IDT processing unit 8115.

The ODT processing unit 8117 converts the color space of the image data of which colors have been corrected by the color correction unit 8116 into the color space of a monitor connected to the image-capturing device 80, and outputs the image data to the monitor.

The codec unit 8118 performs encoding processing of image data, for example, encoding processing corresponding to specifications such as MPEG-2, H.264/AVC, H.265/HEVC, and the like, and outputs the image data to the data processing unit 8119. In addition, decoding processing of the encoded data read from the recording medium 91 by the data processing unit 8119 is performed. For example, the codec unit 8118 performs encoding processing of image data processed by the color correction unit 8116, and outputs the image data to the data processing unit 8119, and performs decoding processing of the encoded data read from the recording medium 91, and outputs the data to the ODT processing unit 8117. Alternatively, the codec unit 8118 may also be configured to perform encoding processing of image data processed by the IDT processing unit 8115, and output the image data to the data processing unit 8119, and perform decoding processing of the encoded data read from the recording medium 91, and output the data to the color correction unit 8116. Still alternatively, the codec unit 8118 may also be configured to perform, e.g., other encoding processing of image data.

The data processing unit 8119 performs processing for recording encoded data and the like provided from the codec unit 8118 to the recording medium 91. The data processing unit 8119 performs processing for reading encoded data and the like recorded in the recording medium 91, and outputting the encoded data to the codec unit 8118.

The recording medium 91 uses, for example, a memory card and the like, and records encoded data and the like provided from the data processing unit 8119. The recording medium 91 is provided detachably with respect to the image-capturing device main body unit 81.

The effective marker composing unit 8121 combines the graphics of effective markers obtained by the meta data obtaining unit 8122 with image data which is output from the sensitizing/desensitizing and gain adjustment and color space conversion unit 8114. The effective marker composing unit 8121 outputs the combined image data to a view finder (not shown).

The meta data obtaining unit 8122 obtains, as meta data, capture gamma equation, white balance, the values of black/gray/white of RAW data, gamma for CDL, and the like. The meta data obtaining unit 8122 provides the obtained meta data to the image-capturing unit 8111, the sensitizing/desensitizing and gain adjustment and color space conversion unit 8114, the IDT processing unit 8115, the color correction unit 8116, and the like. The meta data obtaining unit 8122 obtains EI, effective marker, and ASC-CDL, and provides them to the sensitizing/desensitizing and gain adjustment and color space conversion unit 8114, the effective marker composing unit 8121, the color correction unit 8116, and the like.

The meta data obtaining unit 8122 includes an EI obtaining unit (illumination obtaining unit) for obtaining EI. The EI obtaining unit (not shown) is made by using an illuminometer, and obtains a measured value transmitted by wires or wirelessly from the illuminometer in real time, and converts the measured value into a value of exposure index of photo meter (EI) which is an exposure index value. The meta data obtaining unit 8122 receives effective marker and ASC-CDL which are input by a photographer, a director, and the like by using the user interface unit 8124.

The input and output unit 8123 associates the RAW data obtained by the image-capturing unit 8111 and the meta data obtained by the meta data obtaining unit 8122 with each other, and outputs them to a subsequent stage via the connector 75. The input and output unit 8123 outputs the RAW data provided from a subsequent stage via the connector 75 to the debayer processing unit 8113, and outputs the meta data to the meta data obtaining unit 8122.

As described above, the user interface unit 8124 is constituted by a switch, a button, a dial, and the like for performing selection, operation setting, and the like of various kinds of functions of image-capturing devices, and outputs an operation signal according to the user operation to the control unit 8130.

The display unit 8125 displays the setting state, the operation state, and the like of the image-capturing device on the basis of a control signal given by the control unit 8130.

The control unit 8130 generates a control signal on the basis of an operation signal provided from the user interface unit 8124, and provides the control signal to each unit, so that each unit is controlled to cause the image-capturing device 80 to perform operation and setting according to user operation.

The power supply unit 8135 makes the electric power provided via the connector 75 or the power supply input connector 8133 into desired power supply voltages, and provides the electric powers to the units.

Subsequently, the circuit configuration of the battery pack connection device 83 or the recording and playback device 84 to which the adapter device is applied will be explained. The battery pack connection device 83 or the recording and playback device 84 is provided with an external connection connector. When the battery pack connection device 83 or the recording and playback device 84 is attached to the image-capturing device main body unit 81, and an external connection connector provided on the back surface 81b of the image-capturing device main body unit 81 cannot be used, the external connection connector provided on the battery pack connection device 83 or the recording and playback device 84 can be used instead. When the battery pack connection device 83 or the recording and playback device 84 is attached to the image-capturing device main body unit 81, the external connection connector provided on the battery pack connection device 83 or the recording and playback device 84 is used, so that an external device that can be connected to the image-capturing device main body unit 81 can be expanded.

Figure 25:
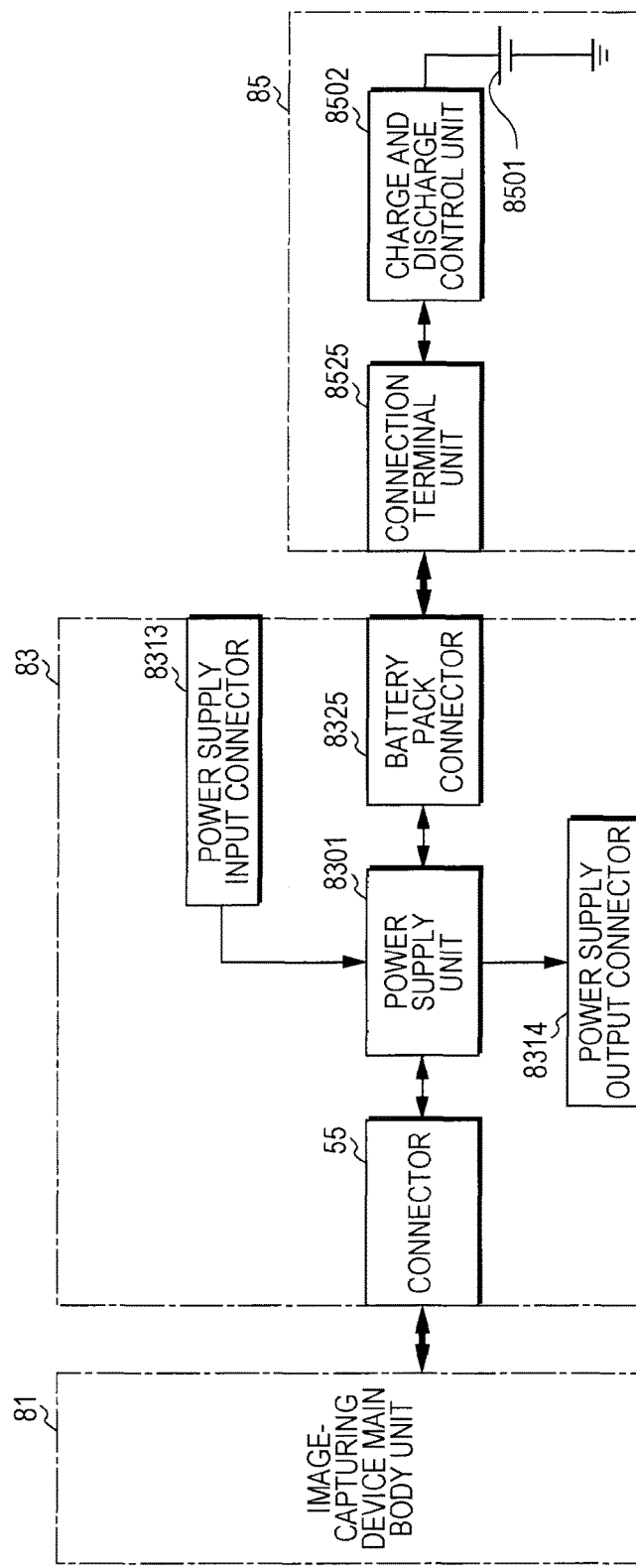
FIG. 25 is a figure schematically showing an example of a circuit configuration of a battery pack connection device and a battery pack.

FIG. 25 is a figure schematically showing an example of a circuit configuration of a battery pack connection device and a battery pack. The battery pack connection device 83 connects the image-capturing device main body unit 81 of the image-capturing device 80 and the battery pack 85. As described above, the battery pack connection device 83 is provided with a connector 55, a power supply input connector 8313, a power supply output connector 8314, and a battery pack connector 8325. The battery pack connection device 83 includes a power supply unit 8301.

The connector 55 is a connector connected to the connector 75 of the image-capturing device main body unit 81. The power supply input connector 8313 is a connector for providing electric power from the external power supply device to the image-capturing device main body unit 81. The power supply output connector 8314 is a connector for providing electric power to an external device. The battery pack connector 8325 is a connector for electrically connecting with the battery pack 85.

The power supply unit 8301 selects any one of the electric powers provided from the power supply input connector 8313 or the battery pack 85, and outputs the electric power from the connector 55 and the power supply output connector 8314. As described above, the power supply unit 8301 outputs the electric power, which is provided from the power supply input connector 8313, via the connector 55. Therefore, even when the battery pack connection device 83 is provided on the back surface 81b of the image-capturing device main body unit 81, and the power supply input connector 8133 cannot be used, the power supply input connector 8313 provided on the battery pack connection device 83 can be used instead.

The battery pack 85 includes a secondary battery 8501 and a charge and discharge control unit 8502. The secondary battery 8501 uses a secondary battery such as a lithium ion battery. The charge and discharge control unit 8502 protects the secondary battery 8501 from over charging and over discharging. The charge and discharge control unit 8502 controls charging of the secondary battery 8501 so that the secondary battery 8501 is charged appropriately. The battery pack 85 provides electric power via the connection terminal unit 8525 to the external device.

Figure 26:
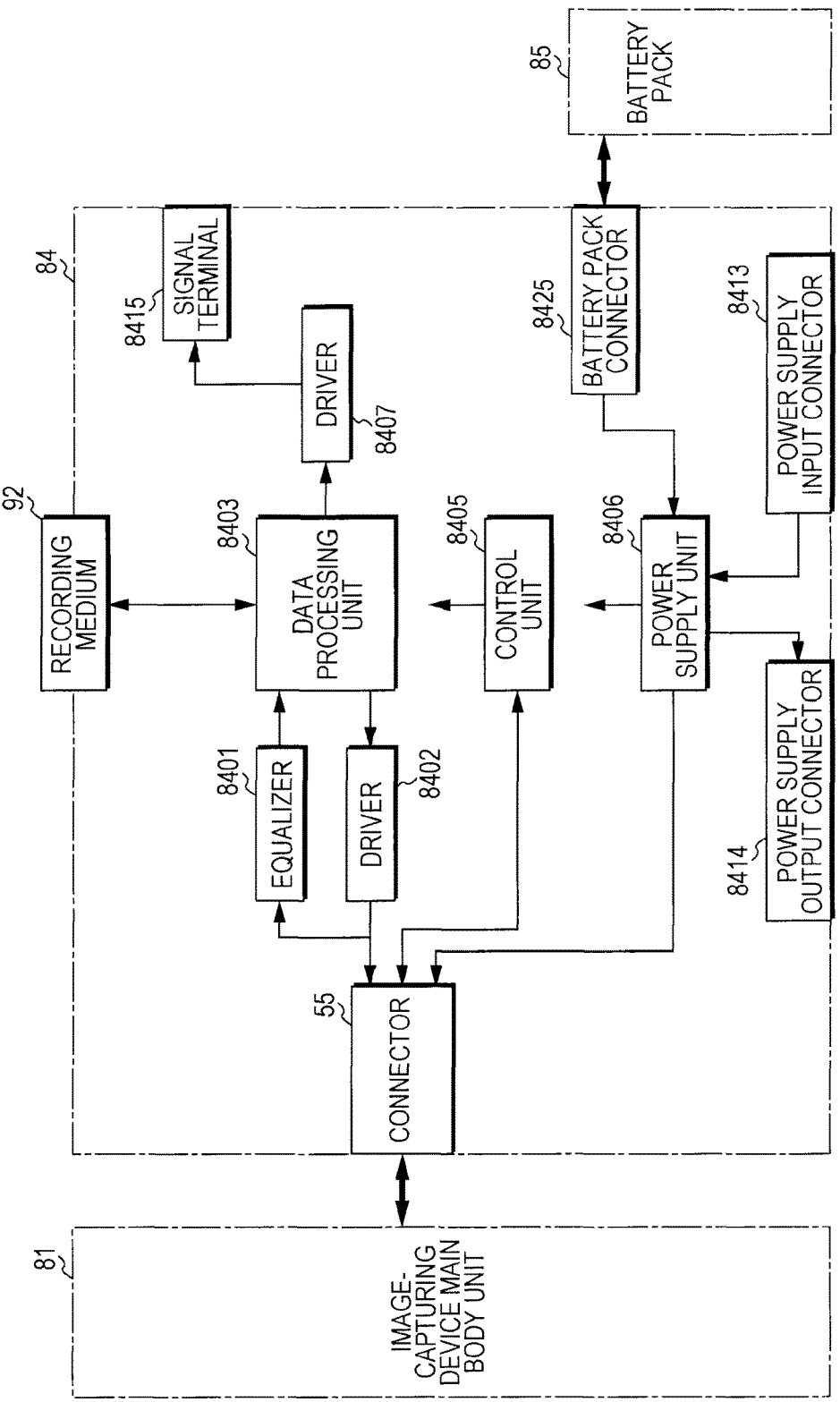
FIG. 26 is a figure schematically showing an example of a circuit configuration of a recording and playback device.

FIG. 26 is a figure schematically showing an example of a circuit configuration of a recording and playback device. The recording and playback device 84 records and plays an image signal and the like generated by the image-capturing device main body unit 81 of the image-capturing device 80, and connects the image-capturing device main body unit 81 and the battery pack 85.

As described above, the recording and playback device 84 includes a connector 55, a power supply input connector 8413, a power supply output connector 8414, a signal output terminal 8415, and a battery pack connector 8425. The recording and playback device 84 includes an equalizer 8401, drivers 8402, 8407, a data processing unit 8403, a control unit 8405, a power supply unit 8406, and a recording medium 92.

The connector 55 is a connector connected to the connector 75 of the image-capturing device main body unit 81. The power supply input connector 8413 is a connector for providing electric power from the external power supply device to the image-capturing device main body unit 81. The power supply output connector 8414 is a connector for providing electric power to an external device. The signal output terminal 8415 is a terminal for outputting an image signal and the like to the external device. The battery pack connector 8425 is a connector for electrically connecting with the battery pack 85.

The equalizer 8401 performs adjustment of the characteristics change in the transmission on a signal of data provided from the input and output unit 8123 of the image-capturing device main body unit 81, and outputs the signal to the data processing unit 8403.

The driver 8402 outputs the data provided from the data processing unit 8403 to the input and output unit 8123 of the image-capturing device main body unit 81.

The data processing unit 8403 performs processing for recording RAW data and meta data, which are data signals provided from the input and output unit 8123 of the image-capturing device main body unit 81, to the recording medium 92. The data processing unit 8403 performs processing for reading RAW data and meta data recorded in the recording medium 92, and outputting the RAW data and the meta data via the driver 8402 to the input and output unit 8123 of the image-capturing device main body unit 81. Further, the data processing unit 8403 outputs the RAW data, the meta data, and the like via the driver 8407 to the external device.

The recording medium 92 uses, for example, a memory card and the like, and records the RAW data and the meta data provided from the data processing unit 8403. The recording medium 92 is provided in the recording and playback device 84 in a detachable manner.

The driver 8407 outputs the RAW data and the like provided from the data processing unit 8403 to the external device via the signal output terminal 8415, so that, for example, the external device can perform monitoring and the like of captured images.

The control unit 8405 communicates with the control unit 8130 of the image-capturing device main body unit 81, and controls each unit so as to cause the recording and playback device 84 to perform operation according to user operation.

The power supply unit 8406 selects any one of the electric powers provided from the power supply input connector 8413 and the battery pack 85, and outputs the electric power via the connector 55 and the power supply output connector 8414. The power supply unit 8406 makes the electric power provided via the power supply input connector 8413 or the battery pack 85 into desired power supply voltages, and provides the electric powers to the units. As described above, the power supply unit 8406 outputs the electric power provided from the power supply input connector 8413 via the connector 55. Therefore, even when the recording and playback device 84 is provided on the back surface 81b of the image-capturing device main body unit 81, and the power supply input connector 8133 cannot be used, the power supply input connector 8413 provided on the recording and playback device 84 can be used instead.

The recording and playback device 84 is provided with the signal output terminal 8415, and when the recording and playback device 84 is connected with the image-capturing device main body unit 81, a signal and the like generated by the image-capturing device main body unit 81 can be output from the signal output terminal 8415. Therefore, an external device that can be connected to the image-capturing device main body unit 81 can be expanded. For example, the image-capturing device main body unit 81 is provided with a signal output terminal for outputting image data and the like having been subjected to various kinds of camera signal processing, and the signal output terminal 8415 outputs the RAW data before the camera signal processing. In this configuration, an external device using RAW data can be connected, and the external device that can be connected to the image-capturing device main body unit 81 can be expanded.

In an electronic device using such adapter device, when the adapter device is attached to the main body device, an operation force for moving an operation lever protruding with respect to the main body device in a non-protruding direction is received, and the movement in the operation direction is converted into the insertion direction of the connector. When the adapter device is detached, an operation force for moving the operation lever in the non-protruding state into the protruding direction is received, and the movement in the operation direction is converted into the detachment and disconnection direction of the connector.

For example, in the battery pack connection device 83 or the recording and playback device 84 to which the adapter device is applied, the operation lever 41 is in the standing state to be at a position protruding with respect to the upper surface of the housing of the image-capturing device main body unit 81 before attachment to the image-capturing device main body unit 81. When the battery pack connection device 83 or the recording and playback device 84 is attached to the image-capturing device main body unit 81, an operation force for changing the operation lever 41 from the standing state to the collapsed state is received, and the movement in the operation direction is converted into the insertion direction of the connector. The operation lever 41 changes to the collapsed state, and it is at a position not protruding with respect to the upper surface of the housing of the image-capturing device main body unit 81. When the battery pack connection device 83 or the recording and playback device 84 are detached from the image-capturing device main body unit 81, an operation force for changing the operation lever 41 from the collapsed state into the standing state is received, and the movement in the operation direction is converted into the detachment and disconnection direction of the connector.

When the battery pack connection device 83 or the recording and the playback device 84 is configured as described above, the operation lever 41 protrudes with respect to the upper surface of the housing of the image-capturing device main body unit 81 to be in the standing state when the battery pack connection device 83 or the recording and the playback device 84 is attached to the image-capturing device main body unit 81, and therefore, the lever operation can be easily done. When the battery pack connection device 83 or the recording and playback device 84 is attached to the image-capturing device main body unit 81, the operation lever 41 is in the collapsed state, and is at a position not protruding with respect to the upper surface of the housing of the image-capturing device main body unit 81. Therefore, this can prevent the operation lever 41 from being operated by mistake while the image-capturing device 80 is used.

When the operation lever 41 is operated from the standing state to the collapsed state, the force applied to the connector 75 of the image-capturing device main body unit 81 and the connector 55 of the battery pack connection device 83 or the recording and playback device 84 can be made into a substantially uniform force in the insertion and detachment direction. Therefore, the connector is not inserted or detached with an inclination with respect to the insertion and detachment direction, and any uneven force is not applied to the connector. Therefore, the connector of the image-capturing device main body unit 81 and the battery pack connection device 83 or the recording and playback device 84 is prevented from being damaged, deformed, contact failure, and the like.

Further, when the connector is connected, the fastening unit provided on the battery pack connection device 83 or the recording and playback device 84 is inserted into the engagement hole of the image-capturing device main body unit 81, and in the fastening units, the hook units of which insertion directions are opposite to each other are in a state of being inserted into the engagement holes. Therefore, the battery pack connection device 83 or the recording and playback device 84 can be reliably prevented from dropping from the image-capturing device main body unit 81.

When the battery pack connection device 83 or the recording and playback device 84 is attached, the power supply input connector 8133 provided at the back surface side of the image-capturing device main body unit 81 may not be used. In this case, the power supply input connector 8313 provided on the battery pack connection device 83 and the power supply input connector 8413 provided on the recording and playback device 84 can be used instead, and therefore, this can prevent the convenience from being reduced. The recording and playback device 84 is provided with a signal output terminal for connection with an external device, and when this signal output terminal is used, an external device that can be connected to the image-capturing device main body unit 81 can be expanded.

It should be noted that the electronic device is not limited to the image-capturing device, and may be a device such as an information processing device for processing various kinds of information. The operation lever 41 is not necessarily provided on the upper surface. Alternatively, the operation lever 41 may be provided on a side surface, a lower surface, or a back surface.

Further, in the above embodiment, a configuration for moving forward and backward the housing provided with the connector in the insertion and detachment direction of the connector in accordance with the rotation operation of the operation lever has been shown for example, but the operation direction of the user is not limited to the above embodiment. For example, the movement direction conversion unit may be configured to convert user's slide operation in the main body device direction and a direction for inserting the hook unit 221*f* into the hook hole 711*a* into a movement in the insertion and detachment direction of the connector. More specifically, when a movement direction conversion unit is constituted by a first link mechanism and a second link mechanism, the first link mechanism converts the user's slide operation in the main body device direction and a direction for inserting the hook unit 221*f* into the hook hole 711*a* into a movement in the surface direction. In this case, when the hook unit 221*f* is inserted into the hook hole 711*a* and the adapter device is fastened to the main body device, for example, as described above, the movement is converted into the movement in the surface direction in a direction opposite to the insertion direction of the hook unit 221*f*. As described above, the second link mechanism may convert the movement in the surface direction into a movement in the insertion and detachment direction of the connector.

Further, the present technique is not to be interpreted by being limited to the embodiment of the technique explained above. The embodiment of this technique discloses the present technique in the form of an example, and it is evident that a person skilled in the art could modify or use an alternative in the embodiment without deviating from the gist of the present technique. More specifically, claims should be taken into consideration when determining the gist of the present technique.

It should be noted that the adapter device according to the present technique may be configured as follows.

(1)

An adapter device including:

an attachment stage on which a fastening unit fastened to a main body device is provided on an attachment surface in advance;

a main body unit provided with a connector; and a movement direction conversion unit configured to receive an operation force, convert a movement in an operation direction into an insertion and detachment direction of the connector, and move forward and backward the main body unit in the insertion and detachment direction of the connector with respect to the attachment stage in accordance with the operation force.

(2)

The adapter device according to (1), wherein the movement direction conversion unit includes a first link mechanism configured to convert the movement in the operation direction into a movement in a surface direction, and a second link mechanism configured to convert the movement in the surface direction into the movement in the insertion and detachment direction of the connector.

(3)

The adapter device according to (2), wherein the first link mechanism includes:

an operation lever configured to rotate upon receiving the operation force;

a driving shaft configured to move in accordance with a rotation operation of the operation lever; and a slider configured to be moved in the surface direction in accordance with the rotation operation of the operation lever by the driving shaft.

(4)

The adapter device according to (2) or (3), wherein the second link mechanism includes a slider having an inclined surface inclined with respect to the surface direction and attached to the main body unit in a movable manner in the surface direction; and a direction conversion unit formed on the attachment stage and having an inclined surface inclined with respect to the insertion and detachment direction, wherein the inclined surface of the slider slides on the inclined surface in accordance with a movement in the surface direction of the slider, so that the main body unit is moved in the insertion and detachment direction with respect to the attachment stage.

(5)

The adapter device according to any of (1) to (4) provided with a second fastening unit fastened to the main body device in accordance with a movement in the connector insertion direction of the main body unit.

(6)

The adapter device according to (5), wherein the slider attached movably in the surface direction according to the operation force with respect to the main body unit is provided with the second fastening unit.

(7)

The adapter device according to (6), wherein the first fastening unit, which is the fastening unit provided in advance on the attachment surface, and the second fastening unit are formed in a hook shape, and the first fastening unit and the second fastening unit are fastened to the main body device in directions opposite to each other.

(8)

The adapter device according to any of (1) to (7), wherein a restriction unit restricting a movement in a direction different from the fastening direction of the fastening unit by engaging with the main body device is provided on the attachment surface.

(9)

The adapter device according to any of (1) to (8), wherein the main body unit is provided with a connector insertion guide protruding in the insertion direction with respect to the connector on the basis of a position of the connector, and the connector insertion guide is protruding from the attachment surface of the attachment stage in accordance with the main body unit moving in the insertion direction of the connector.

(10)

The adapter device according to any of (1) to (9) including:

a holding mechanism configured to hold an operation lever receiving the operation force at a connector insertion completion position; and a cancel mechanism configured to receive an operation force and cancel a holding state at the connector insertion completion position.

(11)

The adapter device according to (10), wherein the operation lever is urged in a connector detachment and disconnection operation direction, when the operation lever is in a state of the connector insertion completion position, the holding mechanism fastens the fastening unit provided on the operation lever, holds the operation lever at the connector insertion completion position, and the cancel mechanism receives an operation force and cancels the fastening state of the fastening unit provided on the operation lever.

INDUSTRIAL APPLICABILITY

In the adapter device and the electronic device according to this technique, the attachment stage is fastened to the main body device by the fastening unit provided on the attachment surface of the attachment stage. The main body unit is provided with the connector, and the movement direction conversion unit receives the operation force and converts the movement in the operation direction into the insertion and detachment direction of the connector, and moves forward and backward the main body unit in the insertion and detachment direction of the connector with respect to the attachment stage in accordance with the operation force. As described above, since the attachment stage is fastened to the main body device, the connector provided on the main body unit moves in the insertion and detachment direction in accordance with the operation force, so that the insertion and detachment operation of the connector can be performed in a stable manner. Therefore, this technique is suitable for an adapter device detachably attached to an electronic device via a connector such as a video camera device having a dockable structure.

REFERENCE SIGNS LIST

10 Adapter device
20 Attachment stage
21, 71 Attachment surface
23, 26 Rotation shaft
25 Insertion hole
27 Spring holding unit
28 Rotation restriction unit
29 Flange portion
30 Slider
31 Base body unit
32 Side plate portion
41 Operation lever
42 Torsion coil spring
45 Lock cancel operation lever
46 Coil spring
50 Housing
55, 75 Connector
56 Connector insertion guide
60 Cover unit
70 Main body device
76 Insertion port
80 Image-capturing device
81 Image-capturing device main body unit
81b Back surface
82 Lens unit
83 Battery pack connection device
84 Recording and playback device
85 Battery pack
91, 92 Recording medium
221, 222, 321 Fastening unit
221f, 321f Hook unit
221p, 222p, 321p, 322p Holding surface
221s, 222s, 321s, 322s Inclined surface
311 Supported hole
312 Driving shaft hole
323 Fastening end
324, 325 Flat surface
411, 451 Operation unit
412, 452 Shaft hole
413 Slider driving shaft
415 Lever fastening unit
453 Spring holding unit
455 Fastening piece
510 Support shaft
511 Sliding pin
531 Screw hole
631 Insertion hole
635 Opening portion
636, 637 Slider reception unit
641 Restriction projection portion
711 Fastening depression portion
711a, 711b Hook hole
741 Restriction depression portion
8111 Image-capturing unit
8112 RAW data processing unit
8113 Debayer processing unit
8114 Sensitizing/desensitizing and gain adjustment and color space conversion unit
8115 IDT processing unit
8116 Color correction unit
8117 ODT processing unit
8118 Codec unit
8119 Data processing unit
8121 Effective marker composing unit
8122 Meta data obtaining unit
8123 Input and output unit
8124 User interface unit
8125 Display unit
8130 Control unit
8133, 8313, 8413 Power supply input connector
8135, 8301, 8406 Power supply unit
8140 Recording medium insertion port
8314, 8414 Power supply output connector
8321, 8421 Battery pack attachment unit
8321a, 8421a Holding depression portion
8322, 8422 Release lever
8322a, 8422a Operation unit
8322b, 8422b Fastening claw
8325, 8425 Battery pack connector
8326, 8426 Position determination guide
8401 Equalizer
8402, 8407 Driver
8403 Data processing unit
8405 Control unit
8415 Signal output terminal
8427 Insertion port open/close lid
8428 Operation lever
8501 Secondary battery
8502 Charge and discharge control unit
8521 Fastening projection portion
8522b Fastening claw holding unit
8525 Connection terminal unit
8526 Position determination groove

The invention claimed is:

1. An adapter device comprising:
an attachment stage on which a first fastener fastened to a main body device is provided on an attachment surface in advance;
a main body provided with a connector; and
a movement direction converter configured to receive an operation force, convert a movement in an operation direction into an insertion and detachment direction of the connector, and move forward and backward the main body in the insertion and detachment direction of the connector with respect to the attachment stage in accordance with the operation force, wherein
the movement direction converter includes
a first link mechanism configured to convert the movement in the operation direction into a movement in a surface direction; and
a second link mechanism configured to convert the movement in the surface direction into the movement in the insertion and detachment direction of the connector.

2. The adapter device according to claim 1, wherein the first link mechanism includes:
an operation lever configured to rotate upon receiving the operation force;
a driving shaft configured to move in accordance with a rotation operation of the operation lever; and
a slider configured to be moved in the surface direction in accordance with the rotation operation of the operation lever by the driving shaft.

3. The adapter device according to claim 1, wherein the second link mechanism includes a slider having an inclined surface inclined with respect to the surface direction and attached to the main body in a movable manner in the surface direction; and
a direction converter formed on the attachment stage and having an inclined surface inclined with respect to the insertion and detachment direction, wherein the inclined surface of the slider slides on the inclined surface in accordance with a movement in the surface direction of the slider, so that the main body is moved in the insertion and detachment direction with respect to the attachment stage.

4. The adapter device according to claim 1 provided with a second fastener fastened to the main body in accordance with a movement in the connector insertion direction of the main body.

5. The adapter device according to claim 4, wherein a slider attached movably in the surface direction according to the operation force with respect to the main body is provided with the second fastener.

6. The adapter device according to claim 5, wherein the first fastener and the second fastener are formed in a hook shape, and the first fastener and the second fastener are fastened to the main body in directions opposite to each other.

7. The adapter device according to claim 1, wherein a restrictor restricting a movement in a direction different from a fastening direction of the first fastener by engaging with the main body is provided on the attachment surface.

8. An adapter device comprising:
an attachment stage on which a fastener fastened to a main body is provided on an attachment surface in advance;
a main body provided with a connector; and
a movement direction converter configured to receive an operation force, convert a movement in an operation direction into an insertion and detachment direction of the connector, and move forward and backward the main body in the insertion and detachment direction of the connector with respect to the attachment stage in accordance with the operation force, wherein
the main body is provided with a connector insertion guide protruding in the insertion direction with respect to the connector on the basis of a position of the connector, and
the connector insertion guide protrudes from the attachment surface of the attachment stage in accordance with the main body moving in the insertion direction of the connector.

9. The adapter device according to claim 1, comprising:
a holding structure configured to hold an operation lever receiving the operation force at a connector insertion completion position; and
a cancel structure configured to receive an operation force and cancel a holding state at the connector insertion completion position.

10. The adapter device according to claim 9, wherein the operation lever is urged in a connector detachment and disconnection operation direction,
when the operation lever is in a state of the connector insertion completion position, the holding mechanism fastens the first fastener provided on the operation lever, holds the operation lever at the connector insertion completion position, and
the cancel structure receives an operation force and cancels the fastening state of the first fastener provided on the operation lever.

11. An electronic device comprising a main body device and an adapter device attached to the main body device and electrically connected to the main body device via a connector,
wherein the adapter device includes:
an attachment stage on which a fastening unit fastened to the main body device is provided on an attachment surface in advance;
a main body unit provided with the connector used for electrical connection with the main body device; and
a movement direction conversion unit configured to receive an operation force with an operation lever, convert a movement in an operation direction into an insertion and detachment direction of the connector, and move forward and backward the main body unit in the insertion and detachment direction of the connector with respect to the attachment stage in accordance with the operation force,
wherein the movement direction conversion unit receives an operation force for moving, in a non-protruding direction, the operation lever protruding with respect to the main body device during attachment to the main body device and converts a movement in the operation direction into an insertion direction of the connector, and the movement direction conversion unit receives an operation force for moving, in a protruding direction, the operation lever in a non-protruding state and converts the movement in the operation direction into the detachment and disconnection direction of the connector.

12. The electronic device according to claim 11, wherein an adapter device attachment surface of the main body device and the adapter device are provided with external connection connectors for connection with an external device, and
when the adapter device is connected via the connector with the main body device, the external connection connector provided on the adapter device is usable instead of the external connection connector of the adapter device attachment surface of the main body device.

13. The electronic device according to claim 11, wherein the adapter device is provided with an external connection connector for connection with an external device, and
when the adapter device is connected via the connector with the main body device, the external device capable of connecting to the main body device is expanded by using the external connection connector.

* * * * *